United States Patent
Sugimoto

(10) Patent No.: US 10,160,443 B2
(45) Date of Patent: Dec. 25, 2018

(54) CONTROL SYSTEM FOR VEHICLE

(71) Applicant: Toyota Jidosha Kabushiki Kaisha, Toyota-shi Aichi-ken (JP)

(72) Inventor: Tetsuya Sugimoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 8 days.

(21) Appl. No.: 15/661,326

(22) Filed: Jul. 27, 2017

(65) Prior Publication Data

US 2018/0037218 A1 Feb. 8, 2018

(30) Foreign Application Priority Data

Aug. 2, 2016 (JP) ................. 2016-152360

(51) Int. Cl.
| | |
|---|---|
| *B60L 9/00* | (2006.01) |
| *B60W 20/14* | (2016.01) |
| *B60W 10/06* | (2006.01) |
| *B60W 10/08* | (2006.01) |
| *B60W 10/30* | (2006.01) |
| *B60W 10/26* | (2006.01) |

(Continued)

(52) U.S. Cl.
CPC ............ *B60W 20/14* (2016.01); *B60K 6/445* (2013.01); *B60L 7/14* (2013.01); *B60W 10/06* (2013.01); *B60W 10/08* (2013.01); *B60W 10/26* (2013.01); *B60W 10/30* (2013.01); *B60W 30/18127* (2013.01); *B60L 2210/10* (2013.01); *B60L 2210/30* (2013.01); *B60L 2240/42* (2013.01); *B60L 2240/44* (2013.01); *B60L 2240/54* (2013.01); *B60W 2510/244* (2013.01); *B60W 2710/305* (2013.01)

(58) Field of Classification Search
CPC ........ B60W 20/14; B60W 10/06; B60K 6/445
See application file for complete search history.

(56) References Cited

U.S. PATENT DOCUMENTS

| | | | |
|---|---|---|---|
| 5,507,153 A | 4/1996 | Seto et al. | |
| 6,338,391 B1 * | 1/2002 | Severinsky ............ | B60K 6/442 180/65.23 |

(Continued)

FOREIGN PATENT DOCUMENTS

| | | |
|---|---|---|
| JP | 3353299 B2 | 12/2002 |
| JP | 2015-174601 A | 10/2015 |

*Primary Examiner* — Adam M Alharbi
(74) *Attorney, Agent, or Firm* — Dinsmore & Shohl LLP

(57) ABSTRACT

A control system for a vehicle includes: a motor-generator to regenerate an electric power; a secondary battery to be charged with the electric power regenerated by the motor-generator; an electrical load to be activated with an electric power supplied from at least one of the motor-generator and the secondary battery; a power supply device to supply the electrical load with the electric power generated by the motor-generator based on a deceleration power generated by a braking operation of the vehicle; and an electronic control unit to calculate excess power which is electric power exceeding chargeable power with which the secondary battery is chargeable of a required deceleration power required by the braking operation, and to control the power supply device in accordance with a command value for causing the electric power supplied from the power supply device to the electrical load to be less than the excess power.

8 Claims, 24 Drawing Sheets

(51) Int. Cl.
*B60L 7/14* (2006.01)
*B60K 6/445* (2007.10)
*B60W 30/18* (2012.01)

(56) References Cited

U.S. PATENT DOCUMENTS

| | | | |
|---|---|---|---|
| 2007/0216358 A1* | 9/2007 | Iida | H02J 7/0029 |
| | | | 320/129 |
| 2009/0171522 A1* | 7/2009 | Luo | B60W 20/40 |
| | | | 701/22 |

* cited by examiner

CONTROL SYSTEM FOR VEHICLE

CROSS-REFERENCE TO RELATED APPLICATIONS

This application claims priority to Japanese Patent Application No. 2016-152360 filed on Aug. 2, 2016, incorporated herein by reference in its entirety.

BACKGROUND

1. Technical Field

The disclosure relates to a control system for a vehicle.

2. Description of Related Art

In a vehicle that can generate regenerative power, even when regenerative power is generated, a battery cannot be charged with electric power exceeding electric power with which the battery can be charged (chargeable power). When electric power exceeding the chargeable power is not used for charging but is wasted as heat, the electric power exceeding the chargeable power is useless. In order to prevent such uselessness of electric power, a technique of supplying regenerative energy to an engine heater when chargeable power of a battery is low at the time of regeneration using a motor is known (for example, Japanese Patent Application Publication No. 2015-174601 (JP 2015-174601 A)).

SUMMARY

A case in which the electric power required for operation of electrical loads such as an engine heater and other electrical equipment is covered with the electric power exceeding chargeable power of a battery (excess power) at the time of regeneration using a motor is conceivable. In this case, when an operating state of the electrical loads varies and electric power consumed by the electrical loads becomes greater than the excess power, the electric power required for operation of the electrical loads cannot be covered with only the excess power and thus electric power is supplied from a secondary battery such as a battery to the electrical loads. However, when electric power consumed by the electrical loads increases excessively, an amount of electric power supplied from the secondary battery to the electrical loads increases and thus there is concern that electric power use efficiency of a vehicle as a whole will decrease.

Therefore, there is demand for a control system for a vehicle with improved electric power use efficiency for the vehicle as a whole.

According to a first aspect of the disclosure, there is provided a control system for a vehicle, including: a motor-generator configured to regenerate electric power when the vehicle decelerates; a secondary battery configured to be charged with the electric power regenerated by the motor-generator; an electrical load configured to be activated with an electric power supplied from at least one of the motor-generator and the secondary battery; a power supply device configured to supply the electrical load with the electric power generated by the motor-generator based on a deceleration power which is generated by a braking operation of the vehicle; and an electronic control unit configured to calculate an excess power which is an electric power exceeding a chargeable power with which the secondary battery is chargeable of a required deceleration power required by the braking operation, and to control the power supply device in accordance with a command value for causing the electric power supplied from the power supply device to the electrical load to be less than the excess power.

According to the first aspect, the electric power from the power supply device is supplied to the electrical load with the excess power set as an upper limit. Accordingly, since the electric power consumed by the electrical load is limited to the excess power as an upper limit, it is possible to limit the electric power supplied from the secondary battery to the electrical load due to operation of the electrical load. As a result, it is possible to improve electric power use efficiency of the vehicle as a whole.

In a second aspect of the disclosure, the electronic control unit may be configured to: calculate a required value for causing the power supply device to supply the electric power required for operation of the electrical load in response to a request from a user; and control the power supply device based on the value with which the electric power supplied to the electrical load is greater of the command value and the required value.

According to the second aspect, the electric power from the power supply device is supplied to the electrical load based on the value with which the electric power supplied to the electrical load is greater of the command value and the required value.

The case in which the electric power supplied to the electrical load is greater with the required value than with the command value includes a situation in which the electrical load requires electric power exceeding the excess power. In this situation, a part of the electric power required for the electrical load is covered with the excess power and the rest is covered with an electric power supplied from the secondary battery. That is, in this case, the electric power required for the electrical load is supplied from the power supply device in accordance with a request from the user.

The case in which the electric power supplied to the electrical load is greater with the command value than with the required value includes a situation in which the electrical load requires electric power less than the excess power or the electrical load does not require an electric power. In this situation, the excess power exceeding the electric power required for the electrical load is supplied from the power supply device to the electrical load. At this time, the electric power supplied from the power supply device to the electrical load is limited to the excess power in accordance with the command value. Accordingly, even when the electrical load is operated by supplying an electric power exceeding the electric power required for the electrical load to the electrical load, the electric power supplied to the electrical load is equal to or less than the excess power and it is thus possible to limit the electric power supplied from the secondary battery. As a result, it is possible to improve electric power use efficiency of the vehicle as a whole.

In a third aspect of the disclosure, the electronic control unit may be configured to: convert an occurrence history of one event of an occurrence of the excess power, a decrease in the chargeable power, and a charging of the secondary battery when the excess power occurs into a numerical value such that the numerical value increases as an occurrence frequency of the event increases and the numerical value decreases as time elapses; and supply an electric power generated from the motor-generator based on the deceleration power to the electrical load even when the numerical value of the occurrence history is equal to or greater than a threshold value, the vehicle decelerates, and the excess power is less than the electric power required for operation of the electrical load.

According to the third aspect, when the excess power at the time of deceleration of the vehicle is less than the electric power required for operation of the electrical load but the numerical value of the occurrence history is equal to or greater than the threshold value, the electric power supplied from the motor-generator based on the deceleration power is supplied to the electrical load. Even when the excess power is less than the electric power required for operation of the electrical load, the electric power based on the deceleration power is supplied to the electrical load and it is thus possible to prevent the secondary battery from being charged with the electric power regenerated by the motor-generator at the time of occurrence of the excess power. Accordingly, it is possible to alleviate an excessive increase of a state of charge of the secondary battery to decrease the chargeable power of the secondary battery.

For example, when the secondary battery is charged with the electric power regenerated by the motor-generator in a state in which the state of charge of the secondary battery is relatively high, an amount of electric power with which the secondary battery can be charged in the future is expected to decrease. This is because the chargeable power of the secondary battery is lower in the state in which the state of charge of the secondary battery is relatively high. Accordingly, even when the excess power is less than the electric power required for operation of the electrical load, it is possible to decrease an amount of electric power with which the secondary battery is charged and thus to decrease the state of charge of the secondary battery. As a result, it is possible to reduce electric power which is not used to charge the secondary battery in the future and is wasted.

In a fourth aspect of the disclosure, the electronic control unit may be configured to: predict a deceleration start time of the vehicle; and convert the occurrence history into a numerical value such that the numerical value increases as the deceleration start time approaches. That is, according to the fourth aspect, the numerical value of the occurrence history increases as the predicted deceleration start time approaches.

For example, when there is at least the occurrence history, the charging of the secondary battery has been limited already by a decrease in the chargeable power of the secondary battery. At this time, when the secondary battery is charged in the near future by deceleration of the vehicle, the chargeable power of the secondary battery is predicted to further decrease. In this regard, according to the fourth aspect, when a time until the predicted deceleration start time is shorter, the numerical value of the occurrence history is more likely to be equal to or greater than the threshold value. Accordingly, since the electric power supplied from the motor-generator based on the deceleration power can be more actively supplied to the electrical load, it is possible to decrease the state of charge of the secondary battery. As a result, it is possible to actively alleviate a decrease in the chargeable power of the secondary battery when the time until the predicted deceleration start time is shorter.

In a fifth aspect of the disclosure, deceleration position information indicating positions at which a plurality of vehicles have decelerated may be accumulated in a server disposed at a position separated from the plurality of vehicles, and the electronic control unit may be configured to predict the deceleration start time of the vehicle based on the deceleration position information and current position information of the vehicle.

According to the fifth aspect, since the deceleration position information of the plurality of vehicles can be used to predict the deceleration start time of the vehicle, it is possible to improve prediction accuracy for the deceleration start time of the vehicle.

In a sixth aspect of the disclosure, the electrical load may be an electrical load of an air-conditioning device, and the air-conditioning device may include a heat storage unit configured to store heat generated by operation of the electrical load.

According to the sixth aspect, even when the electric power supplied from the motor-generator based on the deceleration power is supplied to the electrical load, heat generated by operation of the electrical load is stored in the heat storage unit. Accordingly, it is possible to prevent air-conditioning of the air-conditioning device from acting excessively by supplying the electrical load with the electric power supplied from the motor-generator based on the deceleration power.

In a seventh aspect of the disclosure, the electronic control unit may be configured not to allow the power supply device to supply the electric power supplied from the motor-generator based on the deceleration power to the electrical load in response to the command value when the electrical load performs a transition operation before a current temperature converges on a target temperature, and to allow the power supply device to supply the electric power supplied from the motor-generator based on the deceleration power in response to the command value when the electrical load performs a regular operation after the current temperature converges on the target temperature.

According to the seventh aspect, when the electrical load performs the transition operation, it is possible to prevent a variation in air-conditioning performance of the air-conditioning device at the time of performing the transition operation by supplying the electric power supplied from the motor-generator based on the deceleration power to the electrical load.

In the aspects of the disclosure, the electronic control unit may be embodied by a single electronic control unit or may be embodied by a plurality of electronic control units.

According to the aspects of the disclosure, it is possible to improve electric power use efficiency of the vehicle as a whole.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described.

Figure 1:
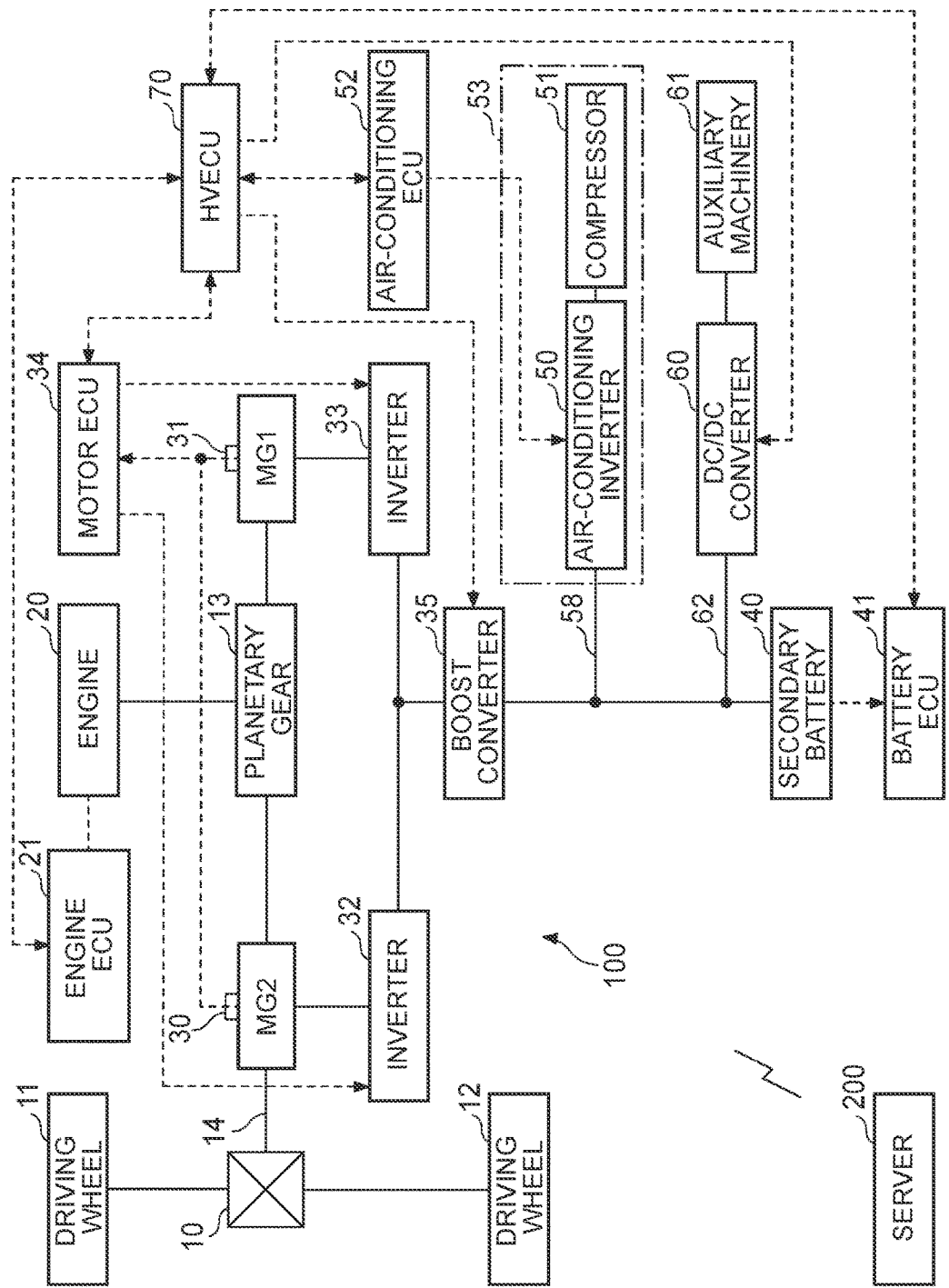
FIG. 1 is a diagram illustrating an example of a configuration of a control system for a vehicle according to an embodiment of the disclosure.
Figure 2:
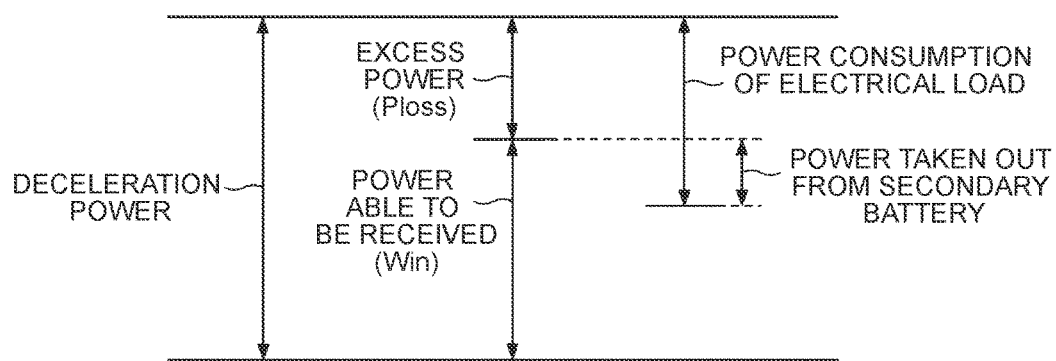
FIG. 2 is a diagram illustrating an example in which a deceleration power generated due to deceleration of the vehicle is greater than a power able to be received by a secondary battery.

FIG. 1 is a diagram illustrating an example of a configuration of a control system for a vehicle according to an embodiment of the disclosure. FIG. 2 is a diagram illustrating an example in which a deceleration power generated due to deceleration of the vehicle is greater than a power able to be received of a secondary battery. A control system for a vehicle 100 is mounted in a so-called hybrid vehicle which uses an engine and a motor together as a power source. The control system for a vehicle 100 may be mounted in a vehicle other than a hybrid vehicle, as long as it is a vehicle that can regenerate electric power at the time of deceleration of the vehicle. Specific examples of a vehicle other than a hybrid vehicle include an electric vehicle, a plug-in hybrid vehicle, and a fuel-cell vehicle. The hybrid type of the hybrid vehicle is not limited to the type illustrated in the drawings.

The control system for a vehicle 100 includes an engine electronic control unit (ECU) 21, a planetary gear 13, a motor-generator 1 (hereinafter referred to as MG1), a motor-generator 2 (hereinafter referred to as MG2), an inverter 33, an inverter 32, a motor ECU 34, a boost converter 35, a secondary battery 40, a battery ECU 41, an air-conditioning device 53, an air-conditioning ECU 52, a DC/DC converter 60, an auxiliary machinery 61, and a hybrid ECU (hybrid vehicle (HV) ECU) 70.

The engine ECU 21 is an engine electronic control unit that controls driving of an engine 20 outputting power using gasoline or diesel oil as fuel. The engine ECU 21 includes a microcomputer including a central processing unit (CPU) and a memory.

The planetary gear 13 includes a carrier that is connected to a crank shaft as an output shaft of the engine 20 and a ring gear that is connected to a drive shaft 14 connected to driving wheels 11 and 12 via a differential gear 10.

The MG1 and MG2 are synchronous generator-motors including a rotor in which a permanent magnet is embedded and a stator on which three-phase coils are wound. The rotor of the MG1 is connected to a sun gear of the planetary gear 13. The rotor of the MG2 is connected to the drive shaft 14. The MG1 and MG2 are examples of a motor-generator that is connected to the driving wheels 11 and 12 of the vehicle via the drive shaft 14. The MG1 and MG2 generate a driving force required as a driving force of the vehicle and generate AC power (regenerate electric power) at the time of deceleration.

The inverter 33 drives the MG1. The inverter 32 drives the MG2. The inverter 33 converts AC power regenerated by the MG1 into DC regenerative power. The inverter 32 converts AC power regenerated by the MG2 into DC regenerative power.

The motor ECU 34 is a motor electronic control unit that controls driving of the MG1 and MG2. The motor ECU 34 controls driving of the MG1 by controlling switching of a plurality of switching elements in the inverter 33 and controls driving of the MG2 by controlling driving of a plurality of switching elements in the inverter 32. The motor ECU 34 includes a microcomputer including a central processing unit (CPU) and a memory.

The boost converter 35 steps down the DC regenerative power generated by the inverter 33 and the inverter 32, supplies the stepped-down DC regenerative power to the secondary battery 40, and supplies the stepped-down DC regenerative power to a power supply path 58 and a power supply path 62. The boost converter 35 steps up the DC power of the secondary battery 40 and supplies the stepped-up DC power to the inverter 33 and the inverter 32.

The secondary battery 40 exchanges electric power with the MG1 via the boost converter 35 and the inverter 33, and exchanges electric power with the MG2 via the boost converter 35 and the inverter 32. The secondary battery 40 can accept the electric power generated by at least one of the MG1 and MG2. Specific examples of the secondary battery 40 include a lithium-ion secondary battery and a nickel-hydrogen secondary battery.

The battery ECU 41 is a secondary battery electronic control unit that manages the secondary battery 40. The battery ECU 41 calculates a state of charge (SOC) of the secondary battery 40 or a power able to be received Win of the secondary battery 40 to manage the secondary battery 40. The power able to be received Win indicates maximum power (maximum allowable power) with which the secondary battery 40 can be charged and indicates chargeable power with which the secondary battery 40 is not overcharged. The power able to be received Win is determined by the temperature and the SOC of the secondary battery 40, decreases as the temperature decreases, and decreases as the SOC increases. The battery ECU 41 calculates the power able to be received Win using a calculation expression or map which has been determined in advance based on the measured temperature and the calculated value of the state of charge of the secondary battery 40. The power able to be received Win indicates chargeable power with which the secondary battery 40 can be charged.

The battery ECU 41 may calculate the power able to be received Win to be equal to or less than predetermined power when a time in which a current flows in the secondary battery 40 is equal to or longer than a predetermined time elapses.

The air-conditioning device 53 receives power supplied from the power supply path 58 and performs air-conditioning in an occupant compartment. The power supply path 58 is connected to the secondary battery 40 and is also connected to the boost converter 35 via the inverter 33 and the inverter 32. The air-conditioning device 53 includes a compressor 51 and an air-conditioning inverter 50.

The compressor 51 compresses a refrigerant in a refrigerant circuit of the air-conditioning device 53. The compressor 51 is an example of an electrical load that can perform a refrigerant compressing operation with electric power supplied via the power supply path 58.

The air-conditioning inverter 50 converts input high-voltage DC electric power into AC electric power for causing the compressor 51 to perform a compressing operation, and supplies the converted AC electric power to the compressor 51. The air-conditioning inverter 50 is an example of a power supply device which is inserted into the power supply path 58.

The air-conditioning ECU 52 is an air-conditioning electronic control unit that controls the air-conditioning inverter 50 in the air-conditioning device 53 such that the compressor 51 performs the compressing operation. The air-conditioning ECU 52 outputs a drive signal for driving the air-conditioning inverter 50 that rotates the compressor 51. The air-conditioning ECU 52 includes a microcomputer including a CPU and a memory.

The DC/DC converter 60 steps down input high-voltage DC electric power to DC electric power for operating the auxiliary machinery 61, and supplies the stepped-down DC electric power to the auxiliary machinery 61. The DC/DC converter 60 is an example of a power supply device which is inserted into the power supply path 62.

The auxiliary machinery 61 is an example of an electrical load that can operate with electric power supplied via the power supply path 62. Specific examples of the auxiliary machinery 61 include an engine heater that heats the engine 20, a steering heater that heats a steering wheel, and a seat heater than heats a seat.

The HV ECU 70 is a hybrid-control electronic control unit that controls driving of the DC/DC converter 60 and the boost converter 35. The HV ECU 70 includes a microcomputer including a CPU and a memory.

The HV ECU 70 calculates required deceleration power Pr which needs to be generated in the drive shaft 14 in decelerating the vehicle (unit: W (watt)). The required deceleration power Pr which is required by a braking operation of the vehicle is equal to a product of a deceleration required for the vehicle and a vehicle weight, and is also equal to a product of a driver-requested braking torque and an axle rotation speed. The driver-requested braking torque indicates a value which is obtained by converting a required deceleration of the vehicle calculated based on an amount of operation of a brake pedal (a depression amount) depressed by a driver into a torque on the drive shaft 14 using a predetermined relational expression or map (unit: N·n (Newton·meter)). The axle rotation speed indicates a rotation speed of the drive shaft 14 (unit: rad/s (radians per second)).

The HV ECU 70 calculates excess power Ploss (unit: W (watt)) based on the required deceleration power Pr and the power able to be received Win of the secondary battery 40. The HV ECU 70 acquires the power able to be received Win from the battery ECU 41. The excess power Ploss indicates power by which the required deceleration power Pr is greater than the power able to be received Win. The HV ECU 70 calculates the excess power Ploss by subtracting the power able to be received Win from the required deceleration power Pr. A control unit (for example, the air-conditioning ECU 52) other than the HV ECU 70 may calculate the excess power Ploss.

The DC/DC converter 60 supplies electric power supplied from at least one of the MG1 and the MG2 to the auxiliary machinery 61 with the excess power Ploss as an upper limit based on deceleration power P which is generated by the braking operation of the vehicle in response to a command value or a required value from the HV ECU 70. The DC/DC converter 60 acquires a part of the deceleration power P, which is generated in the drive shaft 14 at the time of deceleration of the vehicle, from the MG2 via the inverter 32 and the boost converter 35, and supplies the acquired deceleration power to the auxiliary machinery 61 with the excess power Ploss as an upper limit. The DC/DC converter 60 may acquire a part of the deceleration power P, which is generated in the drive shaft 14 at the time of deceleration of the vehicle, from the MG1 via the inverter 33 and the boost converter 35, and may supply the acquired deceleration power to the auxiliary machinery 61 with the excess power Ploss as an upper limit.

Similarly, the air-conditioning inverter 50 supplies electric power supplied from at least one of the MG1 and MG2 to the compressor 51 with the excess power Ploss as an upper limit based on the deceleration power P which is generated by the braking operation of the vehicle in response to a command value or a required value from the air-conditioning ECU 52. The air-conditioning inverter 50 acquires a part of the deceleration power P, which is generated in the drive shaft 14 at the time of deceleration of the vehicle, from the MG2 via the inverter 32 and the boost converter 35 and supplies the acquired deceleration power to the compressor 51 with the excess power Ploss as an upper limit. The air-conditioning inverter 50 may acquire a part of the deceleration power P, which is generated in the drive shaft 14 at the time of deceleration of the vehicle, from the MG1 via the inverter 33 and the boost converter 35 and may supply the acquired deceleration power to the compressor 51 with the excess power Ploss as an upper limit.

Figure 3:
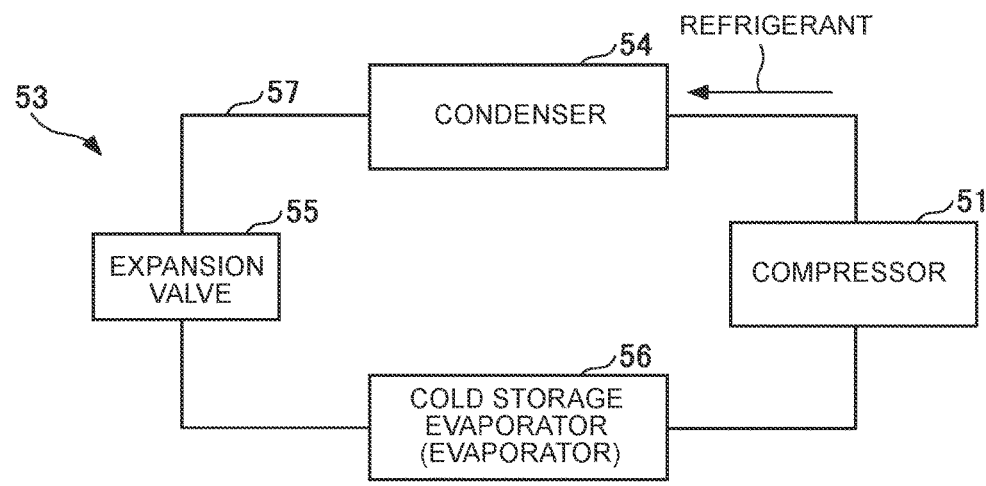
FIG. 3 is a diagram illustrating an example of a configuration of an air-conditioning device.

FIG. 3 is a diagram illustrating an example of a configuration of the air-conditioning device. The air-conditioning device 53 illustrated in FIG. 3 is an example of a cooling system including a refrigerant circuit 57 which includes a compressor 51, a condenser 54, an expansion valve 55, and an evaporator 56.

The compressor 51 compresses a refrigerant and gasifies the refrigerant with a high temperature and a high pressure. The condenser 54 cools and liquefies the gasified refrigerant with a high temperature and a high pressure supplied from the compressor 51. The expansion valve 55 sprays the liquefied refrigerant to the evaporator 56 in the form of mist and changes the refrigerant to a low temperature and a low pressure. The evaporator 56 gasifies the refrigerant in the form of mist, and the evaporator 56 itself is cooled with evaporation heat. Cold wind is supplied to a vehicle interior by causing wind from a blower fan to pass through the cooled evaporator 56. The refrigerant from the evaporator 56 is compressed again by the compressor 51.

When the excess power Ploss is used as operating power of the compressor 51 of the air-conditioning device 53, the excess power Ploss can serve as surplus power for the air-conditioning device 53. Accordingly, in some embodiments the evaporator 56 has a heat storage function (also referred to as a cold storage function in this case) of storing a part or all of the excess power Ploss as thermal energy. The evaporator 56 having a heat storage function is an example of a heat storage unit that stores heat generated due to operation of the compressor 51. Accordingly, even when a part of the deceleration power P is supplied to the compressor 51, the heat generated due to operation of the compressor 51 is stored in the evaporator 56. Accordingly, it is possible to prevent cooling by the air-conditioning device 53 from acting excessively by supplying a part of the deceleration power P to the compressor 51.

Figure 4:
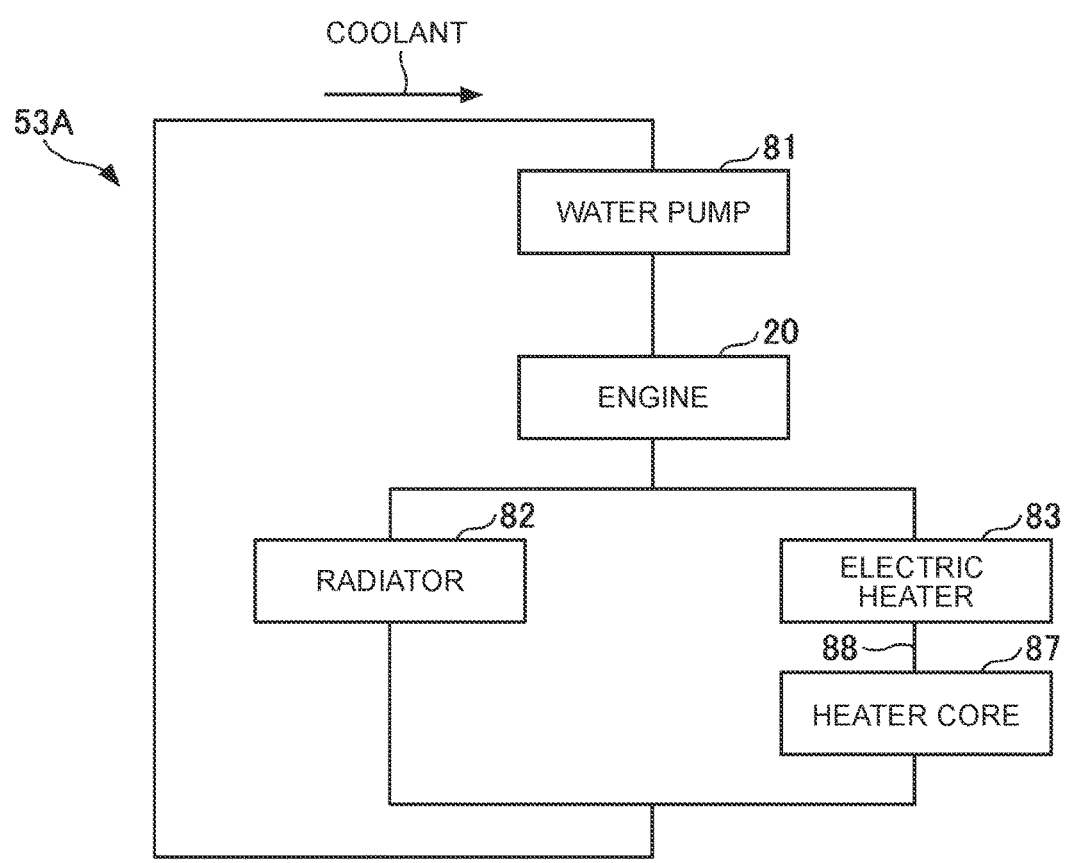
FIG. 4 is a diagram illustrating another example of an air-conditioning device.

FIG. 4 is a diagram illustrating another example of the configuration of the air-conditioning device. An air-conditioning device 53A illustrated in FIG. 4 is an example of a heating system including a coolant circuit 88 which includes an electric heater 83 and a heater core 87.

The air-conditioning device 53A heats the vehicle interior by guiding a coolant heated by the engine 20 to the heater core 87 and sending inside air or outside air to the heater core 87 using a blower motor. The coolant is circulated by a water pump 81 and radiates heat from a radiator 82.

The electric heater 83 is an example of an electrical load that can perform an operation of heating a coolant in the heater core 87 with electric power supplied via the power supply path 58 (see FIG. 1). For example, the electric heater 83 can perform an operation of heating the coolant in the heater core 87 with DC electric power supplied from a DC/DC converter (which is an example of a power supply device) which is inserted into the power supply path 58 and which is not illustrated. The air-conditioning ECU 52 (see FIG. 1) outputs a drive signal for driving the DC/DC converter (not illustrated) which is inserted into the power supply path 58 such that the electric heater 83 performs the operation of heating the coolant.

As described above, when the excess power Ploss is used as operating power of the electric heater 83 of the air-conditioning device 53A, the excess power Ploss can serve as surplus power for the air-conditioning device 53A. Accordingly, in some embodiments the air-conditioning device 53A stores a part or all of the excess power Ploss as thermal energy in the coolant circuit 88. The coolant circuit 88 is an example of a heat storage unit that stores heat generated by operation of the electric heater 83. Accordingly, even when a part of the deceleration power P is supplied to the electric heater 83, the heat generated by operation of the electric heater 83 is stored in the coolant circuit 88. Accordingly, it is possible to prevent heating by the air-conditioning device 53A from acting excessively by supplying a part of the deceleration power P to the electric heater 83.

Figure 5:
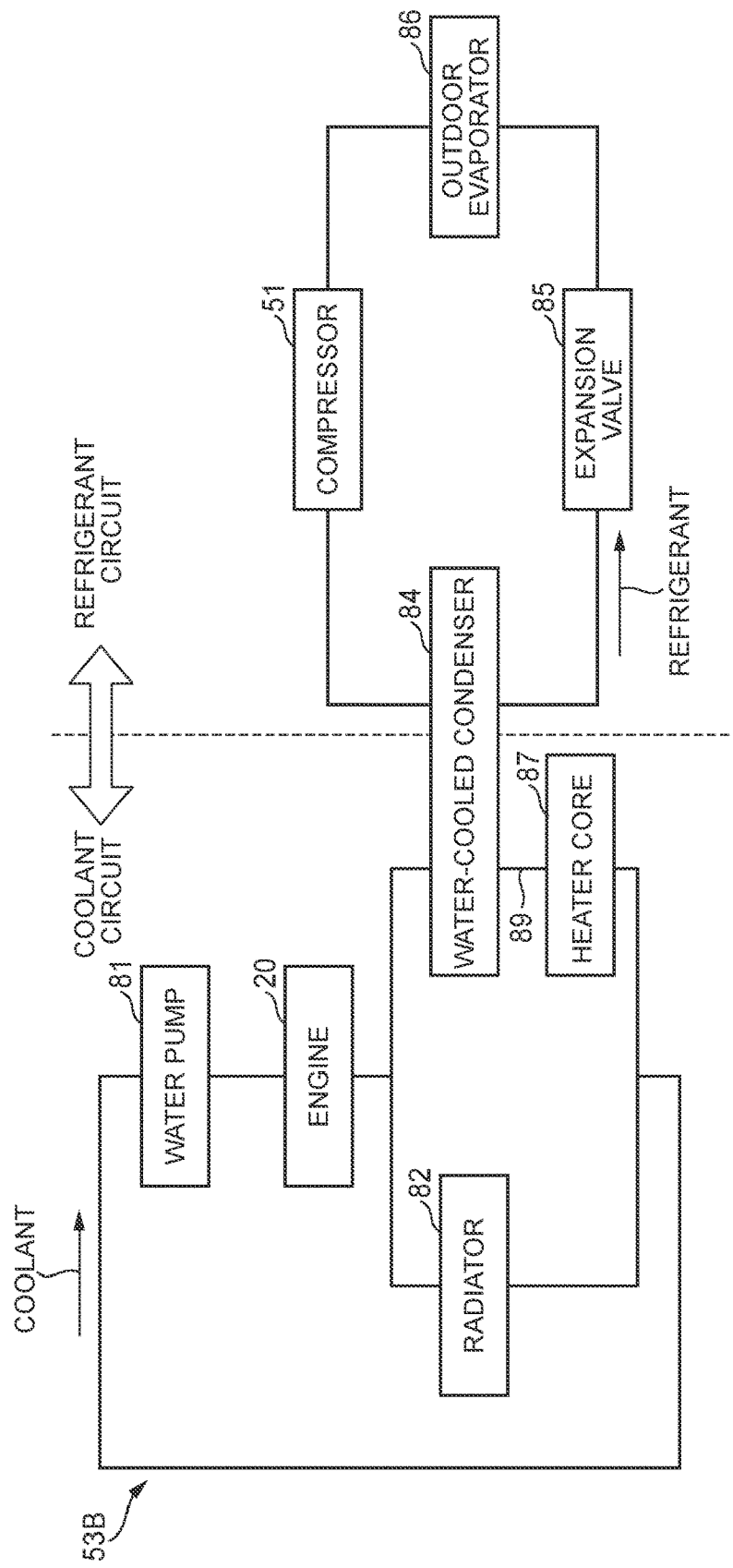
FIG. 5 is a diagram illustrating another example of an air-conditioning device.

FIG. 5 is a diagram illustrating another example of the configuration of the air-conditioning device. An air-conditioning device 53B illustrated in FIG. 5 is a water-heating heat pump system in which a coolant circuit and a refrigerant circuit are combined.

The air-conditioning device 53B compresses a refrigerant to have a high temperature and a high pressure using the compressor 51 at the time of a heating operation. The compressed refrigerant is changed to a low temperature and a low pressure by passing through a water-cooled condenser 84 and then expanding in an expansion valve 85. The refrigerant with a low temperature and a low pressure absorbs heat from air by passing through an outdoor evaporator 86. The refrigerant from the outdoor evaporator 86 is compressed again by the compressor 51. The coolant in the coolant circuit is heated by causing the refrigerant with a high temperature and a high pressure to pass through the water-cooled condenser 84, and the heated coolant is sent to the heater core 87. The vehicle interior is heated by sending inside air or outside air to the heater core 87 using a blower motor.

On the other hand, the air-conditioning device 53B compresses a refrigerant to have a high temperature and a high pressure using the compressor 51 at the time of a heating operation. After passing through a water-cooled condenser 84, the compressed refrigerant does not expand in the expansion valve 85 but is sent to the outdoor evaporator 86. The refrigerant radiating heat in the outdoor evaporator 86 cools air, and the refrigerant with a low temperature and a low pressure is supplied to the compressor 51. When the refrigerant with a high temperature and a high pressure passes through the water-cooled condenser 84, the air-conditioning device 53B does not cause the coolant in the coolant circuit to flow in the heater core 87 and thus does not heat the heater core 87.

As described above, when the excess power Ploss is used as operating power of the compressor 51 of the air-conditioning device 53B, the excess power Ploss can serve as surplus power for the air-conditioning device 53B. Accordingly, in some embodiments the air-conditioning device 53B stores a part or all of the excess power Ploss as thermal energy in a coolant circuit 89 or an outdoor evaporator 86. The coolant circuit 89 and the outdoor evaporator 86 are examples of a heat storage unit that stores heat generated by operation of the compressor 51. Accordingly, even when a part of the deceleration power P is supplied to the compressor 51, the heat generated by operation of the compressor 51 is stored in the coolant circuit 89 or the outdoor evaporator 86. Accordingly, it is possible to prevent heating by the air-conditioning device 53B from acting excessively by supplying a part of the deceleration power P to the compressor 51.

First Embodiment

Figure 6:
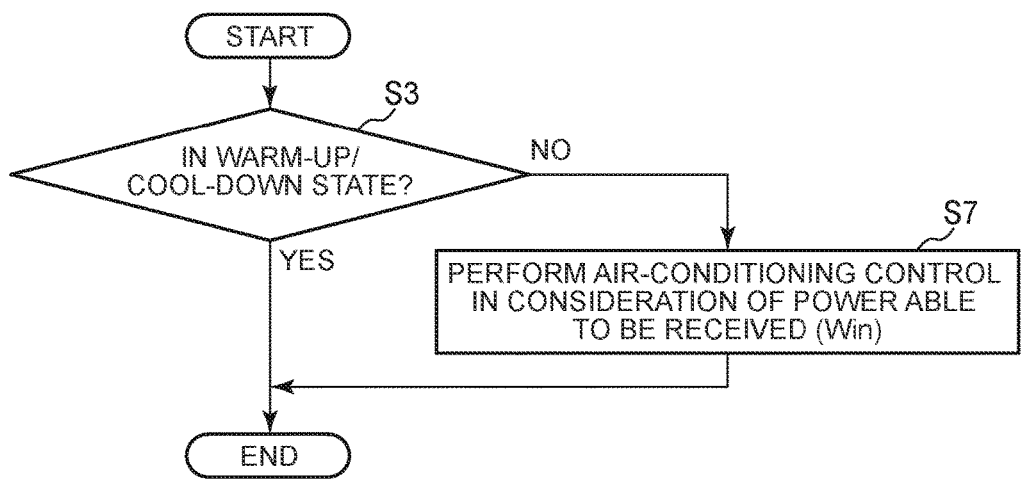
FIG. 6 is a flowchart illustrating an example of a process flow of air-conditioning control by an air-conditioning ECU.

FIG. 6 is a flowchart illustrating an example of a process flow of air-conditioning control by the air-conditioning ECU 52.

The air-conditioning ECU 52 repeatedly performs processes from the start to the end illustrated in FIG. 6 at predetermined intervals.

In Step S3, the air-conditioning ECU 52 determines whether the air-conditioning device 53 in operation is in a warm-up state or a cool-down state. When it is determined that the air-conditioning device 53 in operation is in a warm-up state or a cool-down state, the air-conditioning ECU 52 does not allow the air-conditioning device 53 in operation to perform air-conditioning control in consideration of the power able to be received Win (Step S7). When it is determined that the air-conditioning device 53 in operation is not in a warm-up state or a cool-down state, the air-conditioning ECU 52 allows the air-conditioning device 53 in operation to perform air-conditioning control in consideration of the power able to be received Win (Step S7).

The warm-up state indicates a continuous operating state in which the compressor 51 in a heating operation performs a transition operation before a current temperature converges on a target temperature. A state in which the air-conditioning device 53 in operation is not in the warm-up state indicates an intermittent operating state in which the compressor 51 in a heating operation performs a regular operation after the current temperature converges on the target temperature.

The cool-down state indicates a continuous operating state in which the compressor 51 in a cooling operation performs a transition operation before a current temperature converges on a target temperature. A state in which the air-conditioning device 53 in operation is not in the cool-down state indicates an intermittent operating state in which the compressor 51 in a cooling operation performs a regular operation after the current temperature converges on the target temperature.

When performing the air-conditioning control in consideration of the power able to be received Win (Step S7) is allowed, the air-conditioning inverter 50 is allowed to operation in response to a command value for causing electric power supplied from the air-conditioning inverter 50 to the compressor 51 to be equal to or less than the excess power Ploss. On the other hand, when performing the air-conditioning control in consideration of the power able to be received Win is not allowed, the air-conditioning inverter 50 is not allowed to operation in response to a command value for causing electric power supplied from the air-conditioning inverter 50 to the compressor 51 to be equal to or less than the excess power Ploss.

That is, when the air-conditioning device 53 in operation is in the warm-up state or the cool-down state, the air-conditioning inverter 50 is not allowed to supply electric power from the air-conditioning inverter 50 to the compressor 51 with the excess power Ploss as an upper limit. Accordingly, when the compressor 51 performs a transition operation, it is possible to prevent air-conditioning performance of the air-conditioning device 53 in the transition operation from varying by supplying the electric power from the air-conditioning inverter 50 to the compressor 51.

Figure 7:
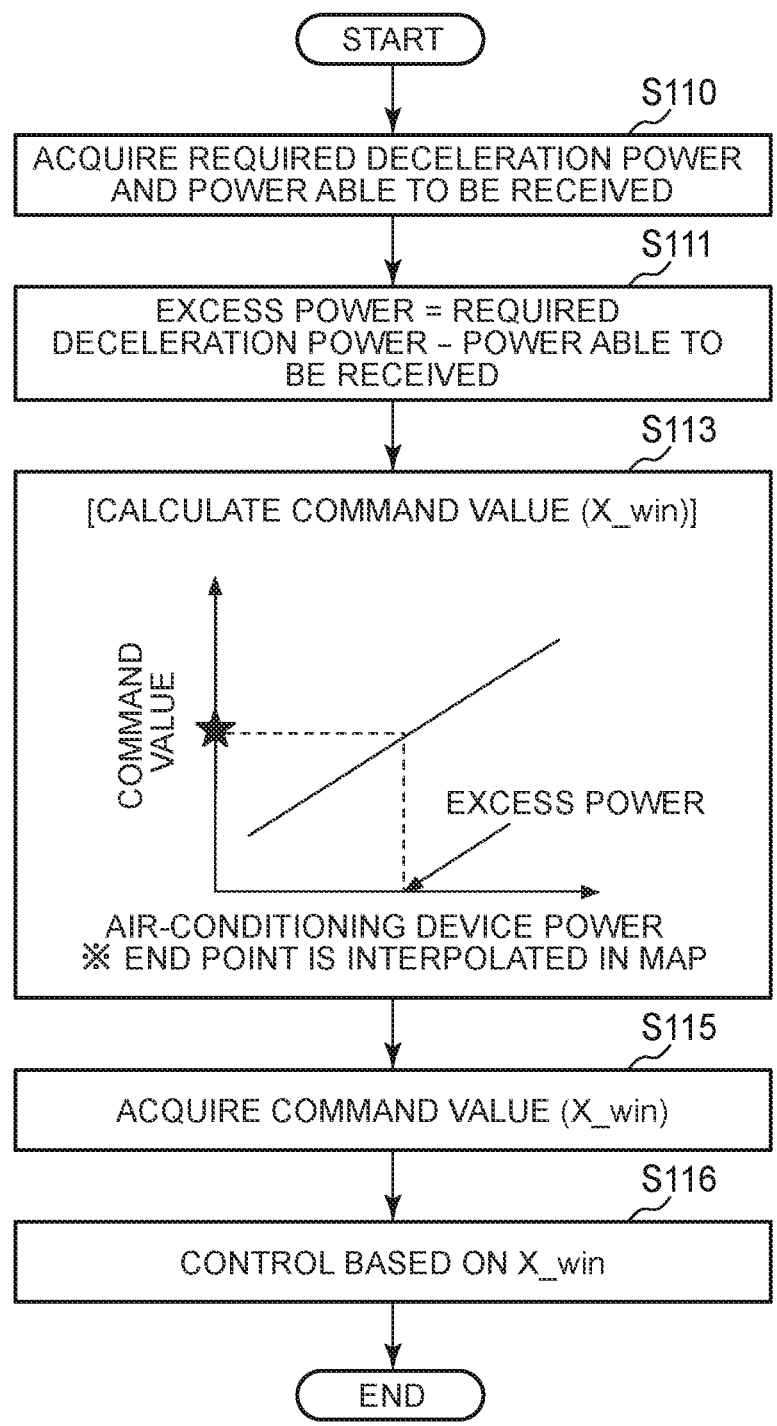
FIG. 7 is a flowchart illustrating an example of a process flow of air-conditioning control in consideration of a power able to be received Win according to a first embodiment.

FIG. 7 is a flowchart illustrating an example of a process flow of the air-conditioning control in consideration of the power able to be received Win according to the first embodiment. FIG. 7 illustrates a process flow of performing process details of Step S7 in FIG. 6.

In the air-conditioning control in consideration of the power able to be received Win, the compressor 51 actively uses electric power when the deceleration power P cannot be regenerated by the secondary battery 40 depending on requirements of the secondary battery 40.

In Step S110, the HV ECU 70 calculates a required deceleration power Pr which needs to be generated in the drive shaft 14 in decelerating the vehicle and acquires a power able to be received Win from the battery ECU 41.

In Step S111, the HV ECU 70 calculates excess power Ploss by subtracting the power able to be received Win from the required deceleration power Pr.

In Step S113, the HV ECU 70 calculates a command value X_win for causing the air-conditioning inverter 50 to supply electric power equal to or less than the excess power Ploss. The HV ECU 70 calculates the command value X_win corresponding to the excess power Ploss calculated in Step S111 in accordance with a relational rule (for example, a map or a relational expression) in which a relationship between the excess power Ploss and the command value X_win is defined. The HV ECU 70 transmits the calculated command value X_win to the air-conditioning ECU 52.

In Step S115, the air-conditioning ECU 52 receives and acquires the command value X_win calculated in Step S113 from the HV ECU 70.

In Step S116, the air-conditioning ECU 52 controls the air-conditioning inverter 50 in response to the command value X_win. The air-conditioning inverter 50 supplies electric power equal to or less than the excess power Ploss to the compressor 51 based on the command value X_win.

Accordingly, the electric power supplied to the compressor 51 is forcibly made to be equal to or less than the excess power Ploss in FIG. 7. Accordingly, since the power consumption of the compressor 51 is limited with the excess power Ploss as an upper limit, it is possible to limit electric power which is taken out from the secondary battery 40 by operation of the compressor 51.

Second Embodiment

Figure 8:
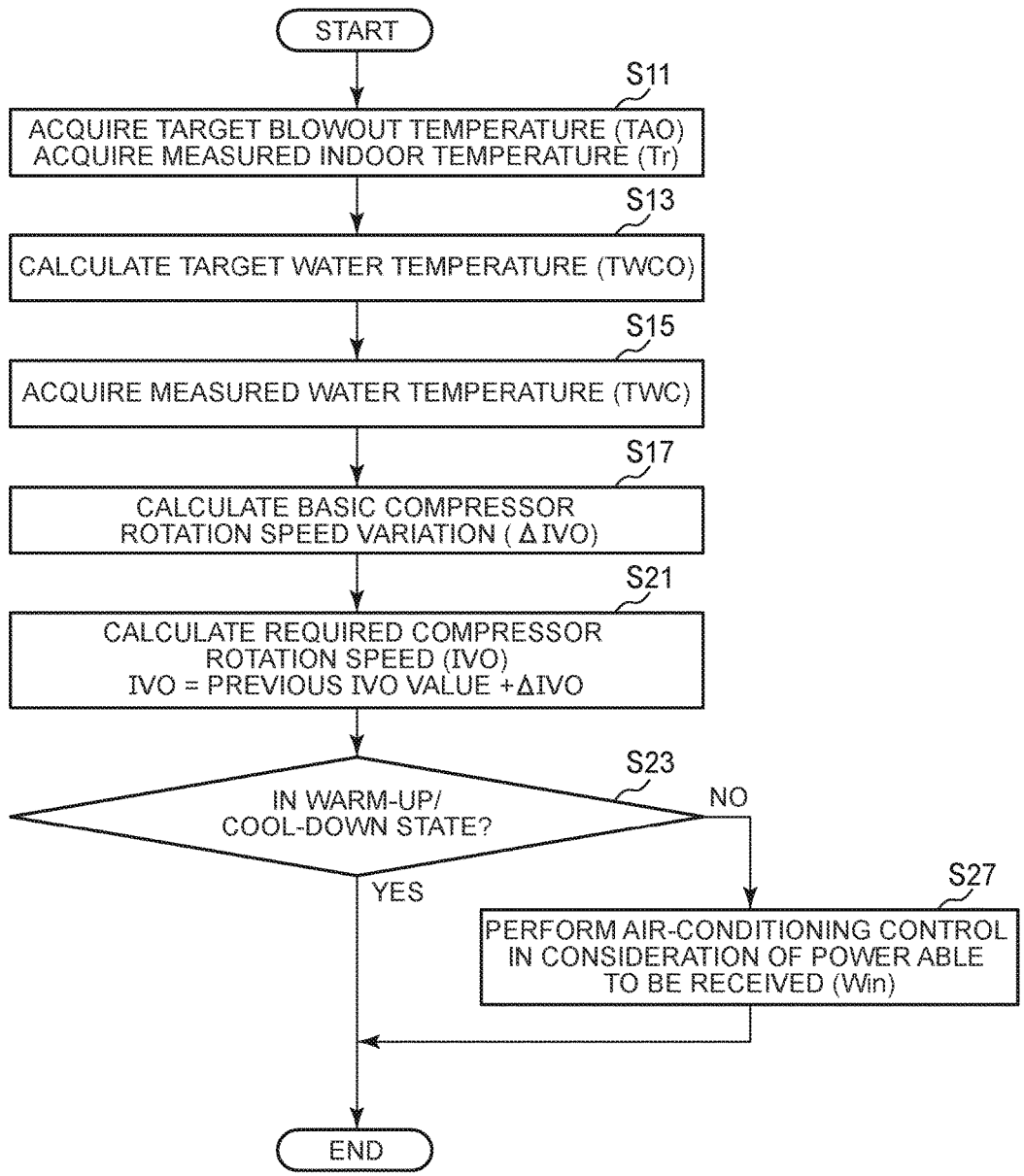
FIG. 8 is a flowchart illustrating an example of a process flow of air-conditioning control by the air-conditioning ECU.

FIG. 8 is a flowchart illustrating an example of a process flow of air-conditioning control by the air-conditioning ECU 52. The air-conditioning ECU 52 repeatedly performs processes from the start to the end illustrated in FIG. 6 at predetermined intervals.

In Step S11, the air-conditioning ECU 52 acquires a target blowout temperature TAO and a measured indoor temperature Tr. The target blowout temperature TAO indicates a target value of the temperature of air which is blown to the vehicle interior by the air-conditioning device 53 and is set depending on a request from a user. The request from the user is input from an on-board interface unit (for example, a switch, a touch panel, or a microphone) that receives the request from the user. The measured indoor temperature Tr indicates a measured temperature of the vehicle interior.

In Step S13, the air-conditioning ECU 52 calculates an air temperature difference ΔTA between the target blowout temperature TAO and the measured indoor temperature Tr and calculates a target water temperature TWCO based on the air temperature difference ΔTA. For example, the air-conditioning ECU 52 calculates the target water temperature TWCO corresponding to the calculated air temperature difference ΔTA based on a relational rule (for example, a map or a relational expression) in which a relationship between the air temperature difference ΔTA and the target water temperature TWCO. The target water temperature TWCO indicates a target temperature of a coolant in the coolant circuit in the air-conditioning device (for example, a coolant in the coolant circuit illustrated in FIG. 5).

In Step S15, the air-conditioning ECU 52 acquires a measured water temperature TWC. The measured water temperature TWC indicates a measured temperature of the coolant in the coolant circuit in the air-conditioning device (for example, the coolant in the coolant circuit illustrated in FIG. 5).

In Step S17, the air-conditioning ECU 52 calculates a water temperature difference ΔTW between the target water temperature TWCO and the measured water temperature TWC and calculates a basic compressor rotation speed variation ΔIVO based on the calculated water temperature difference ΔTW. For example, the air-conditioning ECU 52 calculates the basic compressor rotation speed variation ΔIVO corresponding to the calculated water temperature difference ΔTW in accordance with a relational rule (for example, a map or a relational expression) in which a relationship between the water temperature difference ΔTW and the basic compressor rotation speed variation ΔIVO is defined.

In Step S21, the air-conditioning ECU 52 calculates a required compressor rotation speed IVO by adding a current value of the basic compressor rotation speed variation ΔIVO calculated in Step S17 to a previous value of the basic compressor rotation speed variation ΔIVO. The required compressor rotation speed IVO is an example of a required value for causing the air-conditioning inverter 50 to supply electric power required for operation of the compressor 51 in response to a request from a user.

In Step S23, similarly to Step S3 in FIG. 6, the air-conditioning ECU 52 determines whether the air-conditioning device 53 in operation is in a warm-up state or a cool-down state.

In Step S27, similarly to Step S7 in FIG. 6, the air-conditioning ECU 52 performs air-conditioning control in consideration of the power able to be received Win.

That is, when the air-conditioning device 53 in operation is in the warm-up state or the cool-down state, the air-conditioning inverter 50 is not allowed to supply electric power from the air-conditioning inverter 50 to the compressor 51 with the excess power Ploss as an upper limit. Accordingly, when the compressor 51 performs a transition operation, it is possible to prevent air-conditioning performance of the air-conditioning device 53 in the transition operation from varying by supplying the electric power from the air-conditioning inverter 50 to the compressor 51.

The target water temperature TWCO may be replaced with a target value of the temperature of the refrigerant in the refrigerant circuit in the air-conditioning device, and the measured water temperature TWC may be replaced with the measured value of the temperature of the refrigerant in the refrigerant circuit in the air-conditioning device.

Figure 9:
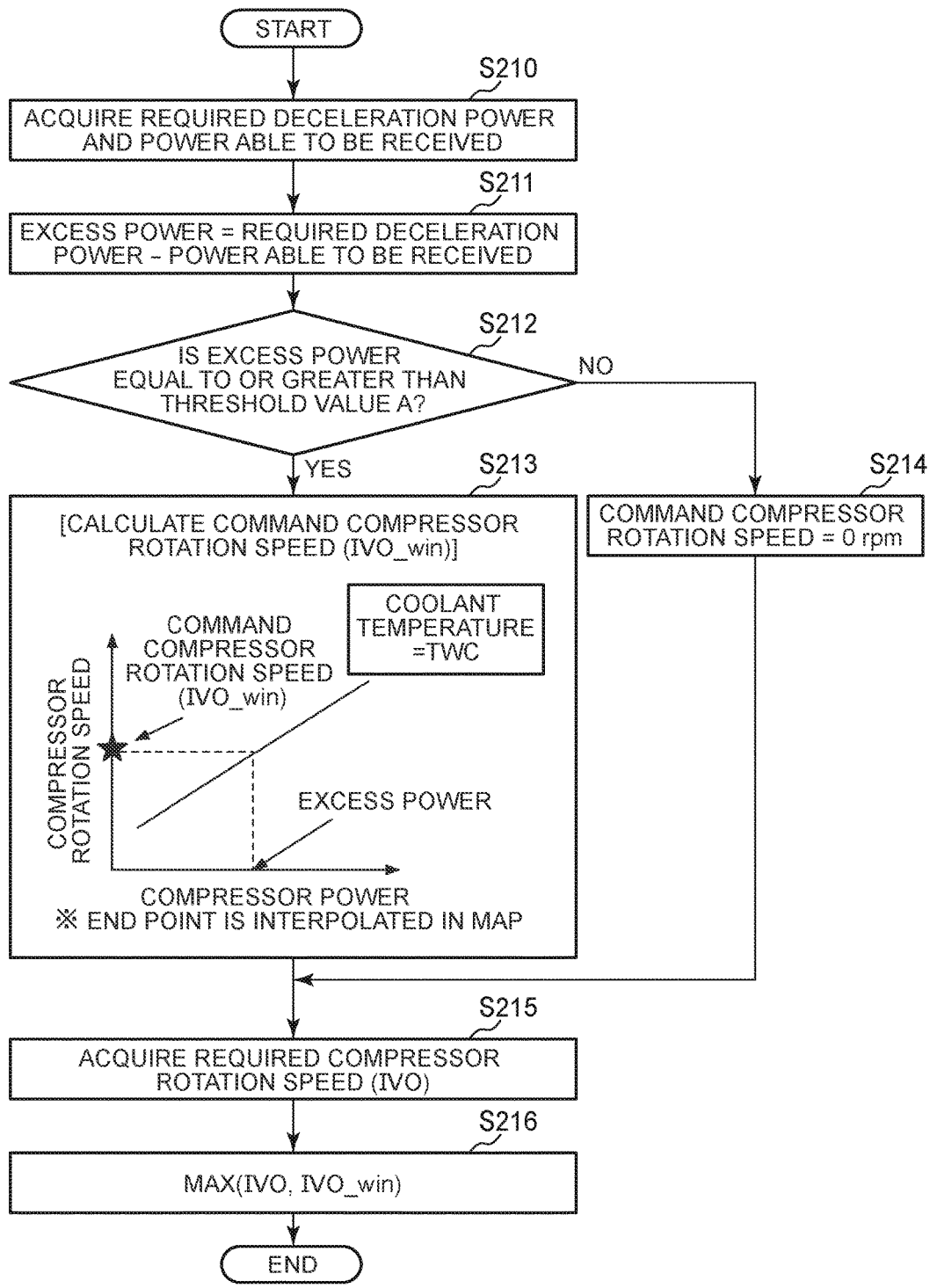
FIG. 9 is a flowchart illustrating an example of a process flow of air-conditioning control in consideration of a power able to be received Win according to a second embodiment.

FIG. 9 is a flowchart illustrating an example of a process flow of the air-conditioning control in consideration of the power able to be received Win according to the second embodiment. FIG. 9 illustrates a process flow of performing process details of Step S27 in FIG. 8.

In Step S210, the HV ECU 70 calculates required deceleration power Pr which needs to be generated in the drive shaft 14 in decelerating the vehicle and acquires a power able to be received Win from the battery ECU 41.

In Step S211, the HV ECU 70 calculates excess power Ploss by subtracting the power able to be received Win from the required deceleration power Pr.

In Step S212, the HV ECU 70 determines whether the excess power Ploss is equal to or greater than a predetermined threshold value A. The threshold value A is set to minimum power required for causing the compressor 51 to operate at a predetermined rotation speed or higher.

The HV ECU 70 performs the process of Step S213 when the excess power Ploss is equal to or greater than the threshold value A, and performs the process of Step S214 when the excess power Ploss is less than the threshold value A.

In Step S213, the HV ECU 70 calculates a compressor rotation speed at which the electric power supplied to the compressor 51 is equal to or less than the excess power Ploss from a predetermined relational rule (for example, a map or a relational expression). The HV ECU 70 sets the rotation speed of the compressor 51 calculated from the predetermined relational rule as a command compressor rotation speed IVO_win. The power and the power consumption of the compressor 51 increase as the rotation speed of the compressor 51 increases. The HV ECU 70 may correct the compressor rotation speed which is set as the command compressor rotation speed IVO_win based on the measured water temperature TWC.

On the other hand, in Step S214, the HV ECU 70 sets the command compressor rotation speed IVO_win to zero.

The HV ECU 70 transmits the command compressor rotation speed IVO_win set in Step S213 or S214 to the air-conditioning ECU 52.

In Step S215, the air-conditioning ECU 52 acquires the required compressor rotation speed IVO calculated in Step S21 in FIG. 8, when the command compressor rotation speed IVO_win is received from the HV ECU 70.

In Step S216, the air-conditioning ECU 52 compares the required compressor rotation speed IVO with the command compressor rotation speed IVO_win and selects one at which the electric power supplied to the compressor 51 is greater. The air-conditioning ECU 52 controls the air-conditioning inverter 50 based on a value at which the electric power supplied to the compressor 51 is greater (that is, a value selected by the air-conditioning ECU 52) of the required compressor rotation speed IVO and the command compressor rotation speed IVO_win. The air-conditioning inverter 50 supplies electric power based on the value selected by the air-conditioning ECU 52.

A case in which the electric power supplied to the compressor 51 is greater at the required compressor rotation speed IVO than at the command compressor rotation speed IVO_win is a situation in which the compressor 51 requires electric power greater than the excess power Ploss. In this situation, a part of the electric power required by the compressor 51 is covered with the excess power Ploss and the other is covered with electric power taken out from the secondary battery 40. That is, in this situation, the electric power required by the compressor 51 is supplied from the air-conditioning inverter 50 in accordance with a request from a user.

On the other hand, a case in which the electric power supplied to the compressor 51 is greater at the command compressor rotation speed IVO_win than at the required compressor rotation speed IVO is a situation in which the compressor 51 requires electric power less than the excess power Ploss or the compressor 51 requires no power. In this situation, the excess power Ploss exceeding the electric power required by the compressor 51 is supplied from the air-conditioning inverter 50 to the compressor 51. At this time, the electric power supplied from the air-conditioning inverter 50 to the compressor 51 is limited to be equal to or less than the excess power Ploss based on the command compressor rotation speed IVO_win. Accordingly, even when the compressor 51 operates by supplying electric power exceeding the electric power required by the compressor 51 to the compressor 51, the electric power supplied to the compressor 51 is equal to or less than the excess power Ploss. As a result, it is possible to limit taking out of electric power from the secondary battery 40.

Figure 10:
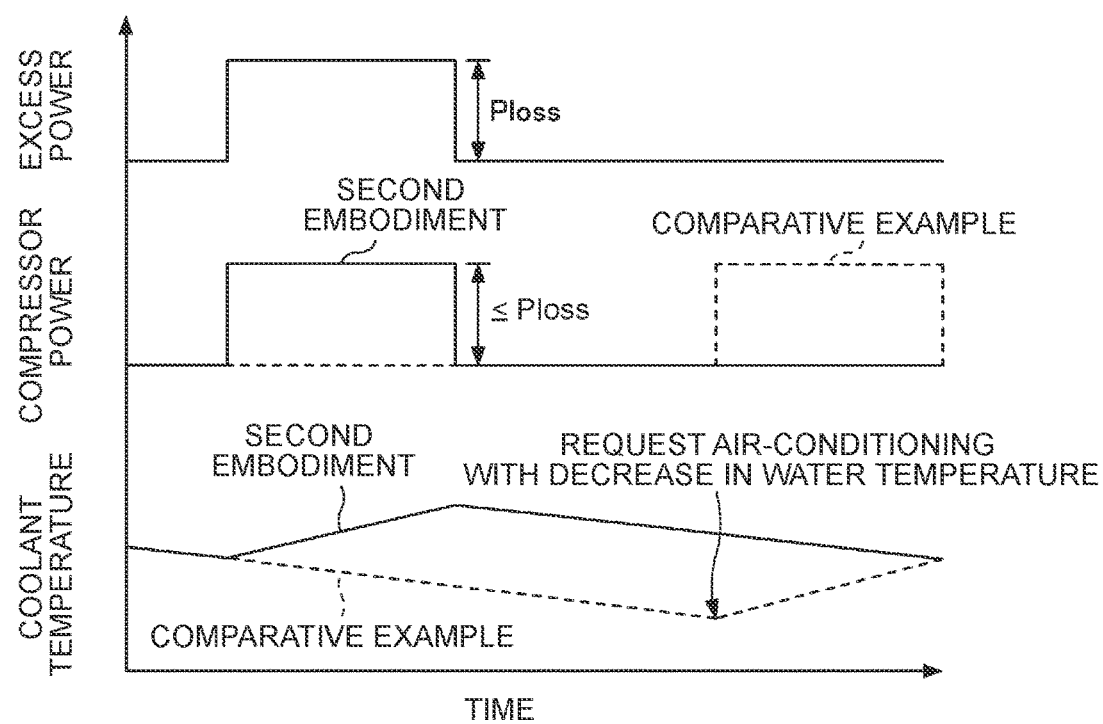
FIG. 10 is a timing chart illustrating an example of a difference in effects between the second embodiment and a comparative example.

FIG. 10 is a timing chart illustrating an example of a difference in effects between the second embodiment and a comparative example. In the comparative example, the excess power Ploss is not used as power for the compressor 51 but is wasted as heat. On the other hand, in the second embodiment, since energy which is uselessly wasted as the excess power Ploss can be used for operation of the compressor 51, it is possible to reduce electric power which will be used in the future for operation of the compressor 51 even when operation of the compressor 51 is required in the future due to a decrease in temperature of the coolant.

Third Embodiment

Figure 11:
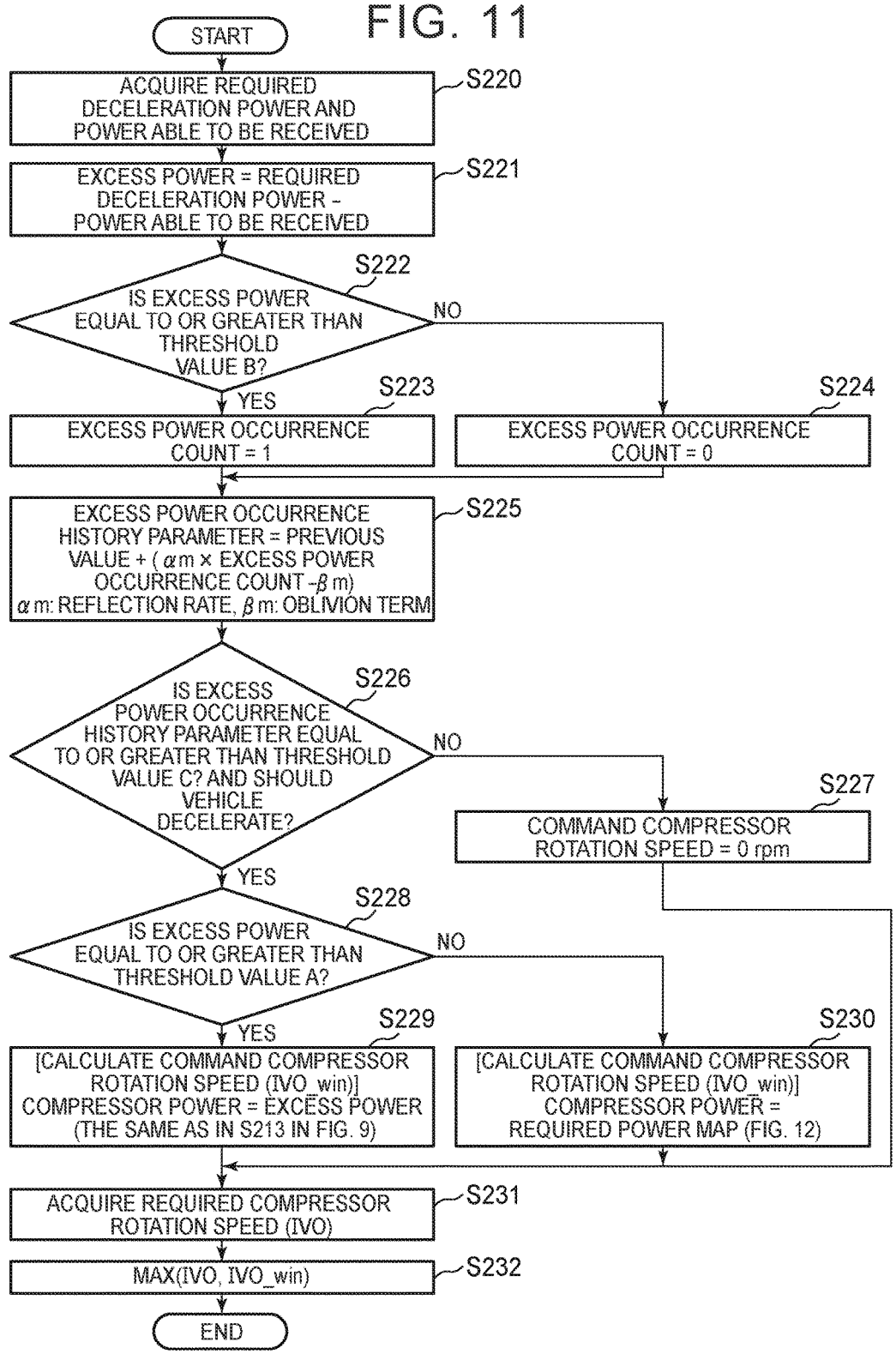
FIG. 11 is a flowchart illustrating an example of a process flow of air-conditioning control in consideration of a power able to be received Win according to a third embodiment.

FIG. 11 is a flowchart illustrating an example of a process flow of the air-conditioning control in consideration of the power able to be received Win according to a third embodiment. FIG. 11 illustrates a process flow of performing process details of Step S27 in FIG. 8.

In Step S220, the HV ECU 70 calculates required deceleration power Pr which needs to be generated in the drive shaft 14 in decelerating the vehicle and acquires a power able to be received Win from the battery ECU 41.

In Step S221, the HV ECU 70 calculates excess power Ploss by subtracting the power able to be received Win from the required deceleration power Pr.

In Step S222, the HV ECU 70 determines whether the excess power Ploss is equal to or greater than a predetermined threshold value B. The threshold value B is set to, for example, zero.

The HV ECU 70 performs the process of Step S223 when the excess power Ploss is equal to or greater than the threshold value B, and performs the process of Step S234 when the excess power Ploss is less than the threshold value B.

In Step S223, the HV ECU 70 sets an excess power occurrence count to a predetermined first count value (for example, 1). On the other hand, in Step S224, the HV ECU 70 sets the excess power occurrence count to a predetermined second count value (for example, 0). The second count value is smaller than the first count value. The excess power occurrence count is an index indicating whether the excess power Ploss occurs.

In Step S225, the HV ECU 70 calculates a current excess power occurrence history parameter by adding ($\alpha m \times$excess power occurrence count$-\beta m$) to a previous excess power occurrence history parameter.

The excess power occurrence history parameter is an example of a numerical value into which an occurrence history of an event which is an occurrence of the excess power Ploss is converted. The HV ECU 70 changes the excess power occurrence history parameter to increase as an occurrence frequency of the excess power Ploss increases and to decrease as a time elapses. $\alpha m$ denotes a reflection rate for reflecting the occurrence frequency of the excess power Ploss in the excess power occurrence history parameter, and $\beta m$ denotes an oblivion term for reflecting the lapse of time in the excess power occurrence history parameter, of which both are values adapted in advance.

In Step S226, the HV ECU 70 determines whether the current excess power occurrence history parameter is equal to or greater than a predetermined threshold value C and the vehicle should decelerate. The threshold value C is a value adapted in advance. The HV ECU 70 performs the process of Step S228 when the current excess power occurrence history parameter is equal to or greater than the threshold value C and the vehicle should decelerate. On the other hand, the HV ECU 70 performs the process of Step S227 when the current excess power occurrence history parameter is less than the threshold value C and the vehicle should not decelerate.

In Step S228, the HV ECU 70 determines whether the excess power Ploss is equal to or greater than a predetermined threshold value A. The threshold value A is set to minimum power required for causing the compressor 51 to operate at a predetermined rotation speed or higher.

The HV ECU 70 performs the process of Step S229 when the current excess power Ploss is equal to or greater than the threshold value A, and performs the process of Step S230 when the current excess power Ploss is less than the threshold value A.

In Step S229, similarly to Step S213 in FIG. 9, the HV ECU 70 calculates a compressor rotation speed at which the electric power supplied to the compressor 51 is equal to or less than the excess power Ploss from a predetermined relational rule (for example, a map or a relational expression). The HV ECU 70 sets the rotation speed of the compressor 51 calculated from the predetermined relational rule as a command compressor rotation speed IVO_win.

On the other hand, in Step S230, the HV ECU 70 calculates the command compressor rotation speed IVO_win to cause the compressor 51 to operate forcibly by supplying a part of the deceleration power P, even when the current excess power Ploss is less than the threshold value A. The HV ECU 70 sets the command compressor rotation speed IVO_win to, for example, a compressor rotation speed at which compressor power calculated from a predetermined required power map can be generated.

Figure 12:
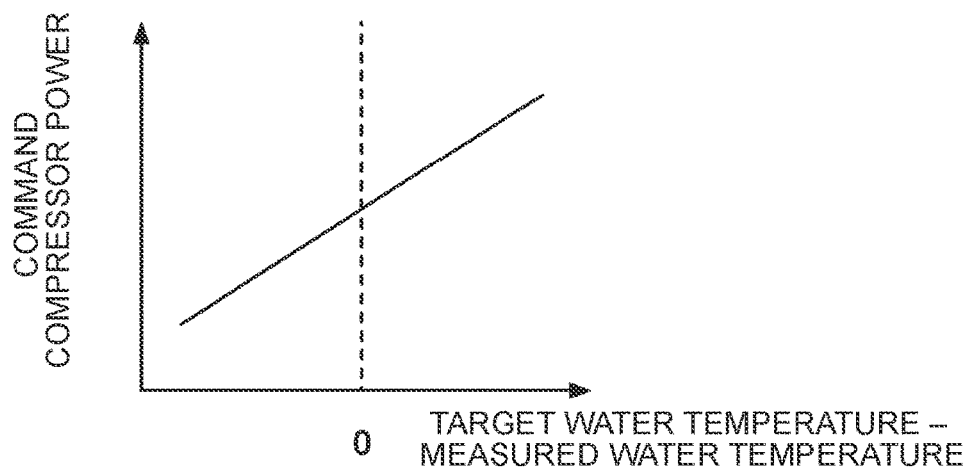
FIG. 12 is a diagram illustrating an example of a required power map.

FIG. 12 is a diagram illustrating an example of the required power map. The HV ECU 70 calculates a command compressor power corresponding to the water temperature difference $\Delta W$ (which is calculated from the values in Step S13 and S15 in FIG. 8) between the target water temperature TWCO and the measured water temperature TWC from a command power map. The HV ECU 70 sets the command compressor rotation speed IVO_win to a compressor rotation speed at which the calculated command compressor power can be generated.

On the other hand, in Step S227 in FIG. 11, the HV ECU 70 sets the command compressor rotation speed IVO_win to zero.

The HV ECU 70 transmits the command compressor rotation speed IVO_win set in Step S229, S230, or S227 to the air-conditioning ECU 52.

In Step S231, the air-conditioning ECU 52 acquires the required compressor rotation speed IVO calculated in Step S21 in FIG. 8, when the command compressor rotation speed IVO_win is received from the HV ECU 70.

In Step S232, the air-conditioning ECU 52 compares the required compressor rotation speed IVO with the command compressor rotation speed IVO_win and selects one at which the electric power supplied to the compressor 51 is greater. The air-conditioning ECU 52 controls the air-conditioning inverter 50 based on a value at which the electric power supplied to the compressor 51 is greater (that is, a value selected by the air-conditioning ECU 52) of the required compressor rotation speed IVO and the command compressor rotation speed IVO_win. The air-conditioning inverter 50 supplies electric power to the compressor 51 based on the value selected by the air-conditioning ECU 52.

Accordingly, when the electric power supplied to the compressor 51 is greater at the required compressor rotation speed IVO than at the command compressor rotation speed IVO_win, the electric power required by the compressor 51 is supplied from the air-conditioning inverter 50 in accordance with a request from a user as illustrated in FIG. 9. That is, a part of the electric power required by the compressor 51 is covered with the excess power Ploss and the other is covered with electric power taken out from the secondary battery 40.

On the other hand, when the electric power supplied to the compressor 51 is greater at the command compressor rotation speed IVO_win than at the required compressor rotation speed IVO, the electric power supplied to the compressor 51 is limited to be equal to or less than the excess power Ploss as illustrated in FIG. 9. Accordingly, even when the compressor 51 operates by supplying electric power exceeding the electric power required by the compressor 51 to the compressor 51, the electric power supplied to the compressor 51 is equal to or less than the excess power Ploss. As a result, it is possible to limit taking out of electric power from the secondary battery 40.

According to Step S230, when it is determined in Step S228 that the excess power Ploss at the time of deceleration of the vehicle is less than the electric power required for operation of the compressor 51, but the excess power occurrence history parameter is equal to or greater than a threshold value C, a part of the deceleration power can be supplied to the compressor 51. Accordingly, even when the excess power Ploss is less than the electric power required for operation of the compressor 51, it is possible to reduce charging of the secondary battery 40 with the electric power regenerated by the MG1 or the MG2 at the time of occurrence of the excess power Ploss. As a result, it is possible to alleviate a decrease in the power able to be received Win of the secondary battery 40 due to an excessive increase in the state of charge of the secondary battery 40.

Figure 13:
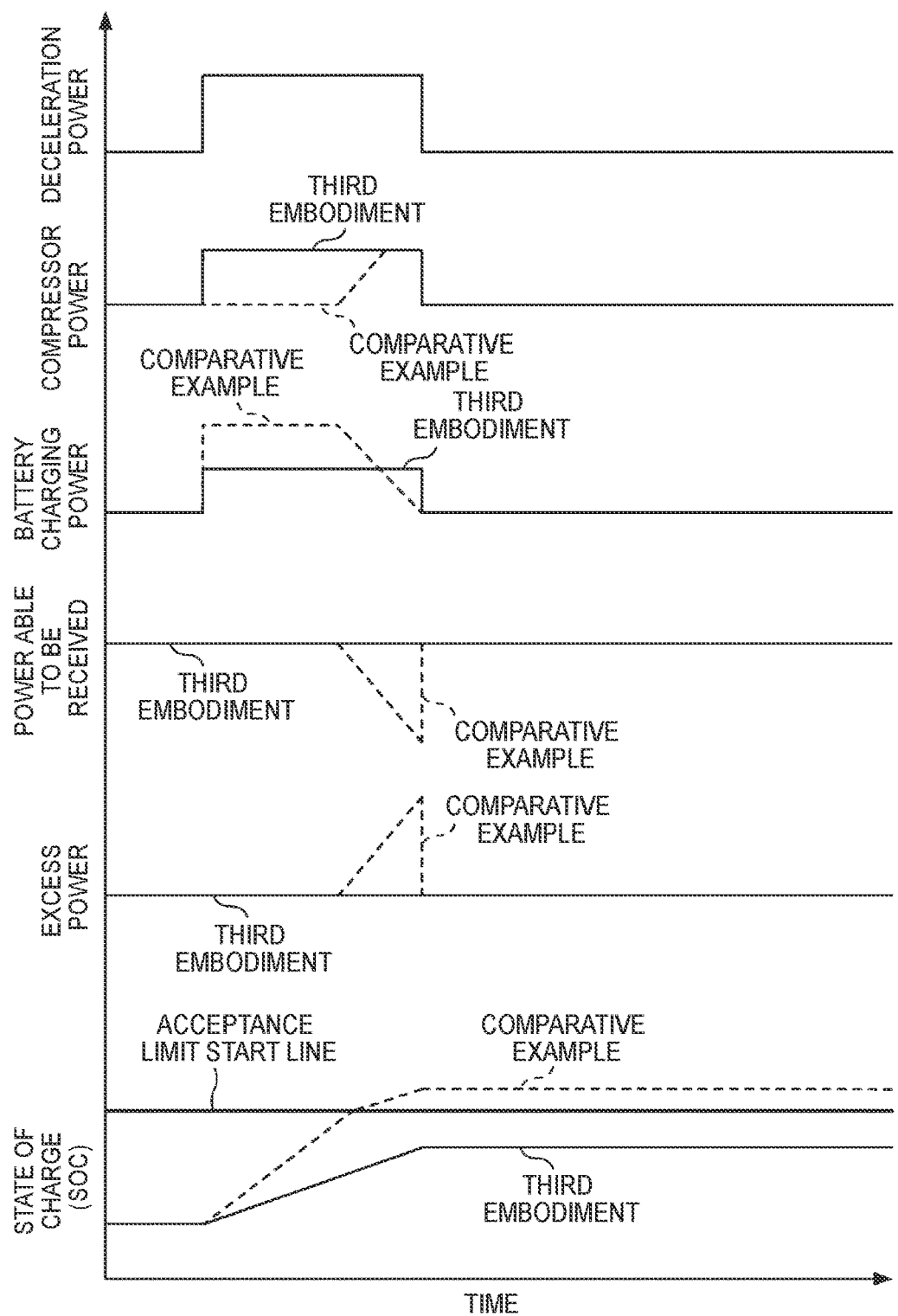
FIG. 13 is a timing chart illustrating an example of a difference in effects between the third embodiment and a comparative example.

FIG. 13 is a timing chart illustrating an example of a difference in effects between the third embodiment and a comparative example. FIG. 13 illustrates a state in which the state of charge (SOC) of the secondary battery 40 is relatively high. In this state, when the secondary battery 40 is charged with electric power regenerated by the MG1 or the MG2, an amount of power with which the secondary battery 40 can be charged in the future is expected to decrease. This is because in the state in which the state of charge (SOC) of the secondary battery 40 is relatively high, the SOC goes over an acceptance limit start line in which charging of the secondary battery 40 is limited and the power able to be received of the secondary battery 40 decreases. Accordingly, in the third embodiment, by supplying the electric power to the compressor 51 even when the excess power Ploss is less than the electric power required for operation of the compressor 51, it is possible to reduce a battery-charging power of the secondary battery 40 and to reduce the state of charge of the secondary battery 40 in comparison with in the comparative example. As a result, it is possible to reduce electric power which is not used to charge the secondary battery 40 but is wasted. The SOC can be made to be below the acceptance limit start line.

The required compressor rotation speed IVO calculated in Step S21 in FIG. 8 is a compressor rotation speed for achieving the target water temperature by normal air-conditioning control. On the other hand, the command compressor rotation speed IVO_win calculated in Step S230 in FIG. 11 is a compressor rotation speed for driving the compressor 51 to reduce charging of the secondary battery 40 even when the excess power Ploss does not occur as described above. An example of a case in which the command compressor rotation speed IVO_win calculated in Step S230 is selected in Step S231 is a case in which the required compressor rotation speed IVO is relatively low (for example, a case in which it is determined in the normal air-conditioning control that operation of the compressor 51 is not necessary). Accordingly, the command compressor rotation speed IVO_win calculated in Step S230 is set to be higher than the required compressor rotation speed IVO, in comparison with the water temperature difference between the target water temperature and the measured water temperature at the same temperature.

Fourth Embodiment

In the third embodiment, $\alpha m$ and $\beta m$ are determined by adaptation in advance. However, the HV ECU 70 may predict a deceleration start time of the vehicle and may convert the excess power occurrence history to increase as the predicted deceleration start time approaches. The HV ECU 70 changes the excess power occurrence history parameter to increase as the predicted deceleration start time approaches. Specifically, the HV ECU 70 changes $\alpha m$ and $\beta m$ to increase as the predicted deceleration start time approaches and changes the excess power occurrence history parameter.

Figure 14:
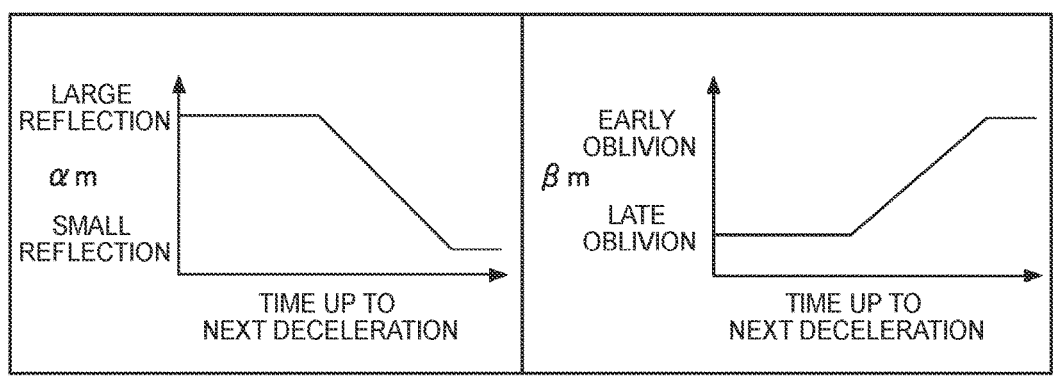
FIG. 14 is a diagram illustrating an example of relationships between a time until a predicted deceleration start time and αm and βm.

FIG. 14 is a diagram illustrating an example of a relationship between a time up to the predicted deceleration start time and $\alpha m$ and $\beta m$. The HV ECU 70 increases $\alpha m$ as the time from the current time to the predicted deceleration start time and decreases $\beta m$ as the time from the current time to the predicted deceleration start time decreases, based on the relational rule illustrating the relationship.

In this way, in the fourth embodiment, the HV ECU 70 predicts the deceleration start time of the vehicle and changes the excess power occurrence history parameter to increase as the predicted deceleration start time approaches.

Figure 15:
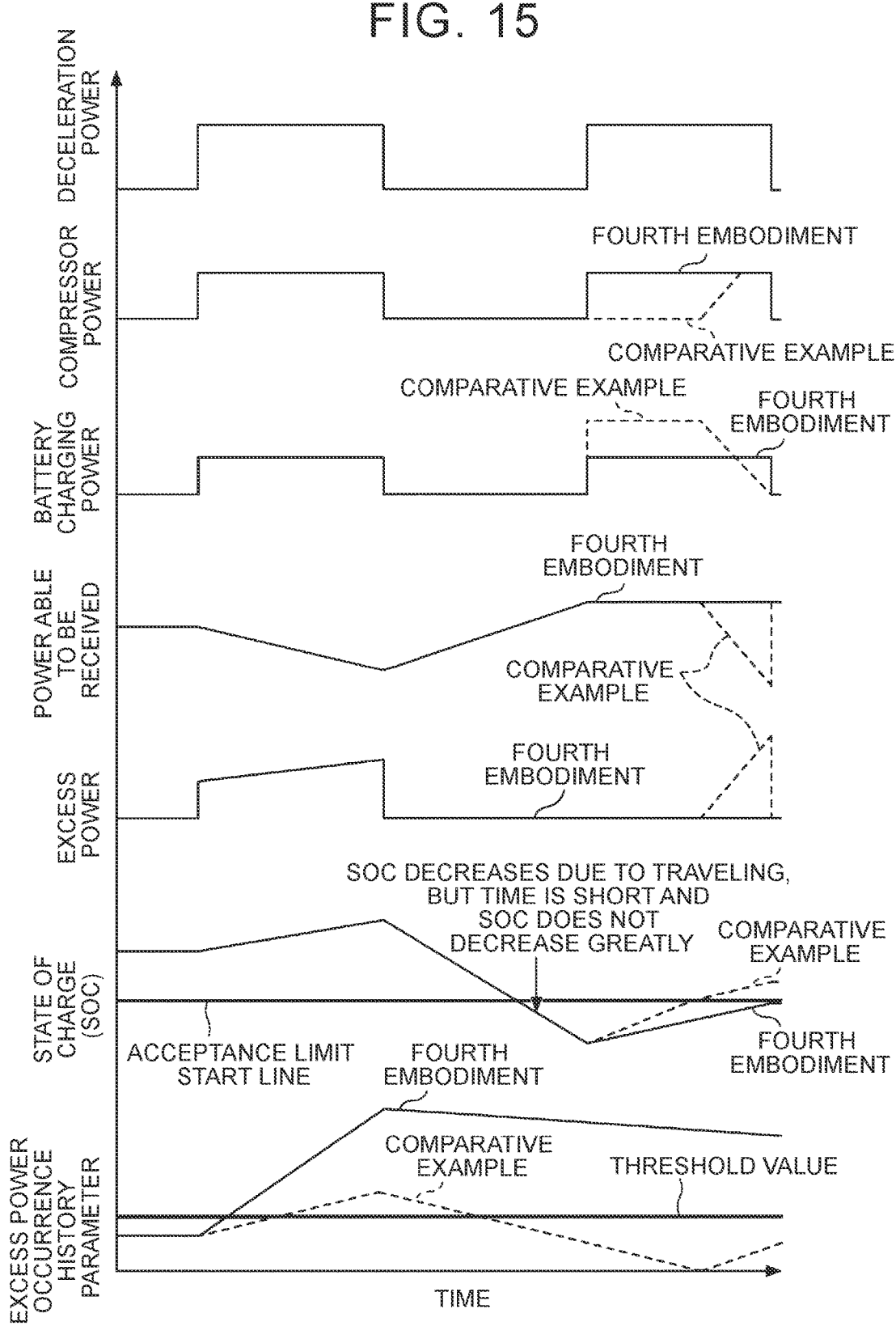
FIG. 15 is a timing chart illustrating an example of a difference in effects between a fourth embodiment and a comparative example when a time until a next deceleration is relatively short.

FIG. 15 is a timing chart illustrating an example of a difference in effects between the fourth embodiment and a comparative example when the time up to next deceleration is relatively short (deceleration is going to be performed soon).

In FIG. 15, when there is at least an excess power occurrence history, the charging of the secondary battery 40 is already limited due to a decrease in the power able to be received Win of the secondary battery 40 (the SOC is above the acceptance limit start line). At this time, when the secondary battery 40 is charged by deceleration of the vehicle in the near future, it is estimated that the power able to be received Win decreases further. Accordingly, the deceleration power P which can be used by the vehicle decreases and thus fuel efficiency degrades. Therefore, according to the fourth embodiment, as the time up to the predicted deceleration start time becomes shorter, the excess power occurrence history parameter is more likely to be maintained equal to or greater than the threshold value C (see Step S226 in FIG. 11). Accordingly, since a part of the deceleration power P can be more actively supplied to the compressor 51, it is possible to reduce the state of charge of the secondary battery 40. Accordingly, it is possible to more actively alleviate a decrease in the power able to be received Win as the time up to the predicted deceleration start time becomes shorter.

Figure 16:
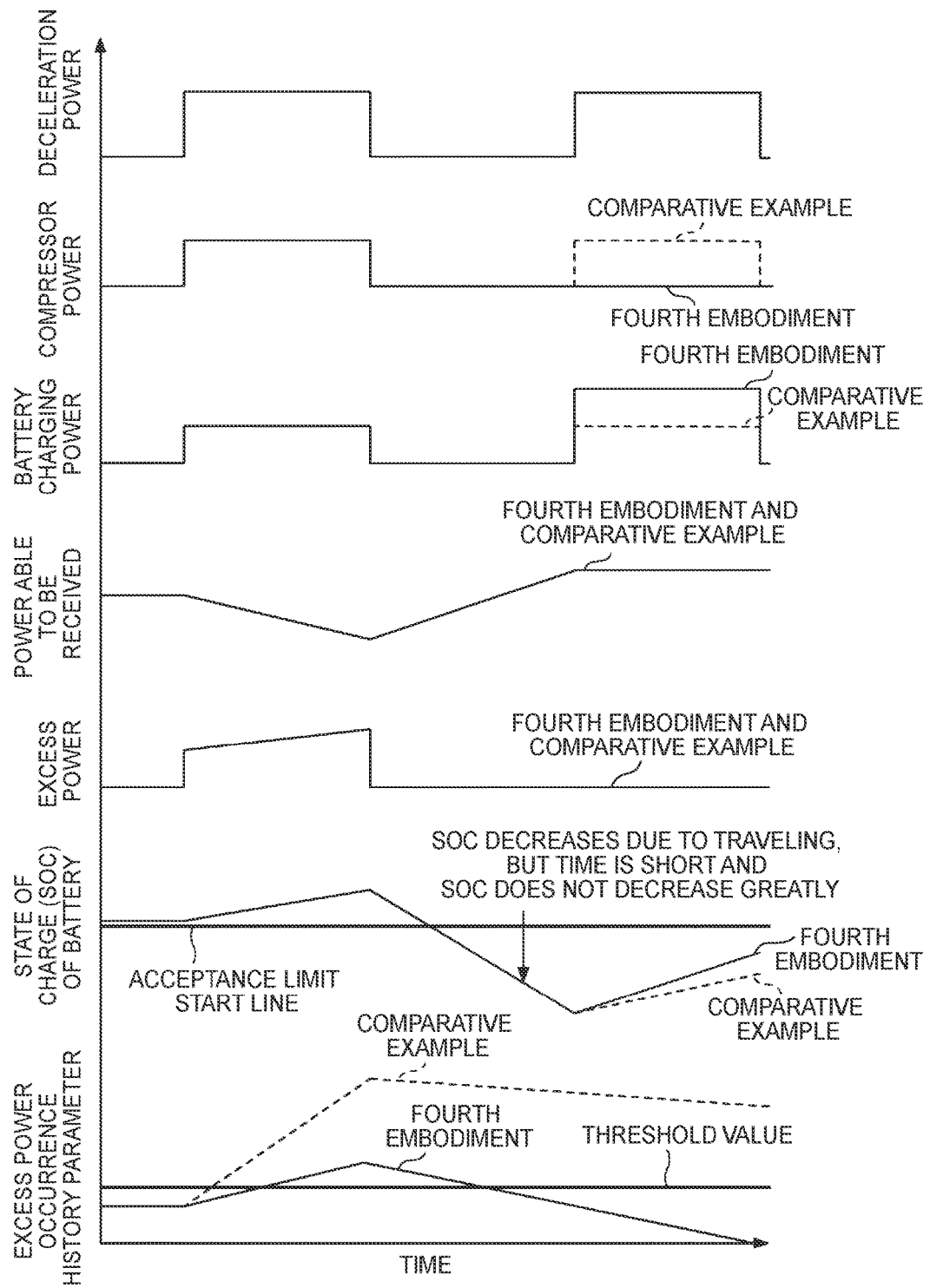
FIG. 16 is a timing chart illustrating an example of a difference in effects between the fourth embodiment and a comparative example when a time until a next deceleration is relatively long.

FIG. 16 is a timing chart illustrating an example of a difference in effects between the fourth embodiment and a comparative example when the time up to next deceleration is relatively long (deceleration is not going to be performed soon).

In FIG. 16, when the excess power occurrence history parameter is equal to or greater than the threshold value C and charging of a battery by deceleration is not going to be performed up to a certain time, limiting of the charging of the secondary battery 40 is alleviated (that is, the power able to be received Win increases). Accordingly, in this case, since there is little necessity for forcible operation of the compressor 51 in a situation in which an operation request of the compressor 51 is not issued by the regular air-conditioning control, in some embodiments the excess power occurrence history parameter be maintained less than the threshold value C. According to the fourth embodiment, as the time up to the predicted deceleration start time increases, the excess power occurrence history parameter is more likely to be maintained less than the threshold value C.

In the fourth embodiment, for example, the HV ECU 70 can store and accumulate deceleration position information indicating a position at which the vehicle decelerates in the memory from time to time, and can predict the deceleration start time of the vehicle based on the accumulated deceleration position information and the current position information of the vehicle.

Alternatively, deceleration position information indicating positions at which a plurality of vehicles decelerate may be accumulated in a server 200 (see FIG. 1) disposed at a position separated from the plurality of vehicles. The HV ECU 70 can predict the deceleration start time of the vehicle based on the deceleration start time accumulated in the server 200 and the current position information of the vehicle. Since the deceleration position information of a plurality of vehicles can be used to predict the deceleration start time of the vehicle, it is possible to improve prediction accuracy of the deceleration start time of the vehicle. The HV ECU 70 can acquire the deceleration position information accumulated in the server 200 by radio communication.

Fifth Embodiment

In the third embodiment, detection of deceleration of the vehicle is used as one determination condition in Step S226 in FIG. 11. A delay time is present in a device such as the compressor 51 until electric power can be actually used. It is also predicted that a communication delay between the ECUs occurs in an actual vehicle. Therefore, when a next deceleration start time point can be predicted as in the fourth embodiment, it is possible to satisfactorily use a part of the deceleration power P for the compressor 51 at the time of deceleration of the vehicle by outputting a command for starting the compressor 51 prior to the next deceleration start time point by a preliminary time tdelay.

Figure 17:
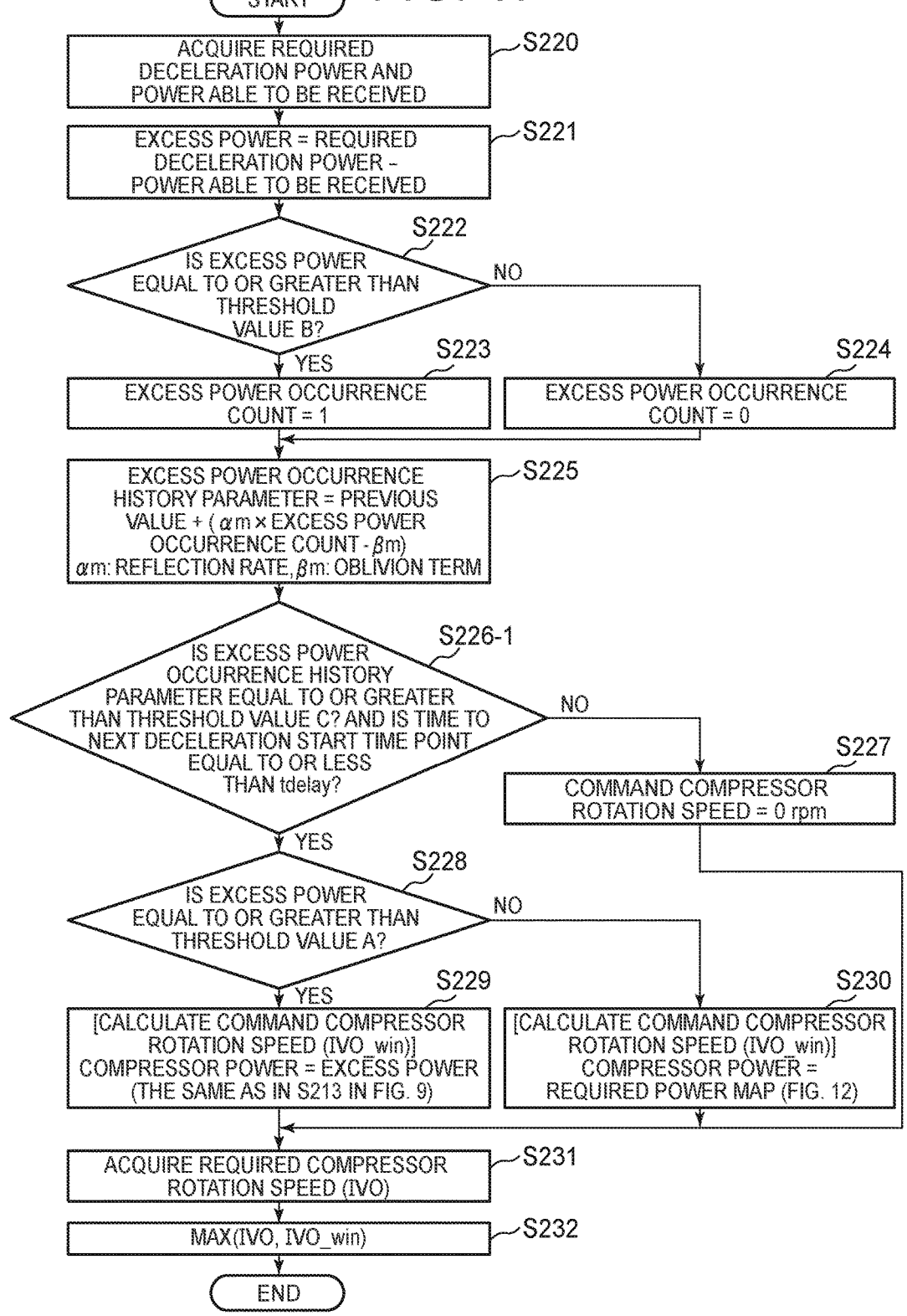
FIG. 17 is a flowchart illustrating an example of a process flow of air-conditioning control in consideration of a power able to be received Win according to a fifth embodiment.

FIG. 17 is a flowchart illustrating an example of a process flow of the air-conditioning control in consideration of the power able to be received Win according to a fifth embodiment. FIG. 17 illustrates a process flow of performing process details of Step S27 in FIG. 8.

In FIG. 17, the process details of Step S226 in FIG. 11 is replaced with the process details of Step S226-1. The others are the same as described above. In Step S226-1, the HV ECU 70 determines whether the current excess power occurrence history parameter is equal to or greater than a predetermined threshold value C and the time up to the next deceleration start time point is equal to or less than the preliminary time tdelay. The threshold value C is a value adapted in advance. When the current excess power occurrence history parameter is equal to or greater than the threshold value C and the time up to the next deceleration start time point is equal to or less than the preliminary time tdelay, the HV ECU 70 performs the process of Step S228. On the other hand, when the current excess power occurrence history parameter is less than the threshold value C or the time up to the next deceleration start time point is greater than the preliminary time tdelay, the HV ECU 70 performs the process of Step S227.

Figure 18:
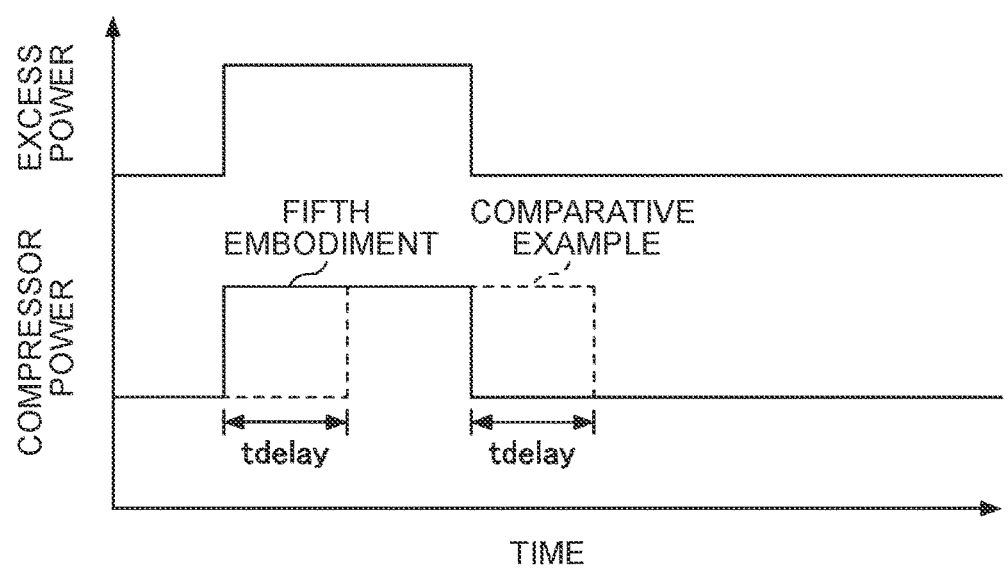
FIG. 18 is a timing chart illustrating an example of a difference in effects between the fifth embodiment and a comparative example.

FIG. 18 is a timing chart illustrating an example of a difference in effects between the fifth embodiment and a comparative example. In the fifth embodiment, when a next deceleration start time point can be predicted, it is possible to eliminate the delay time by outputting a command for starting the compressor 51 prior to the next deceleration start time point by the preliminary time tdelay.

Sixth Embodiment

Figure 19:
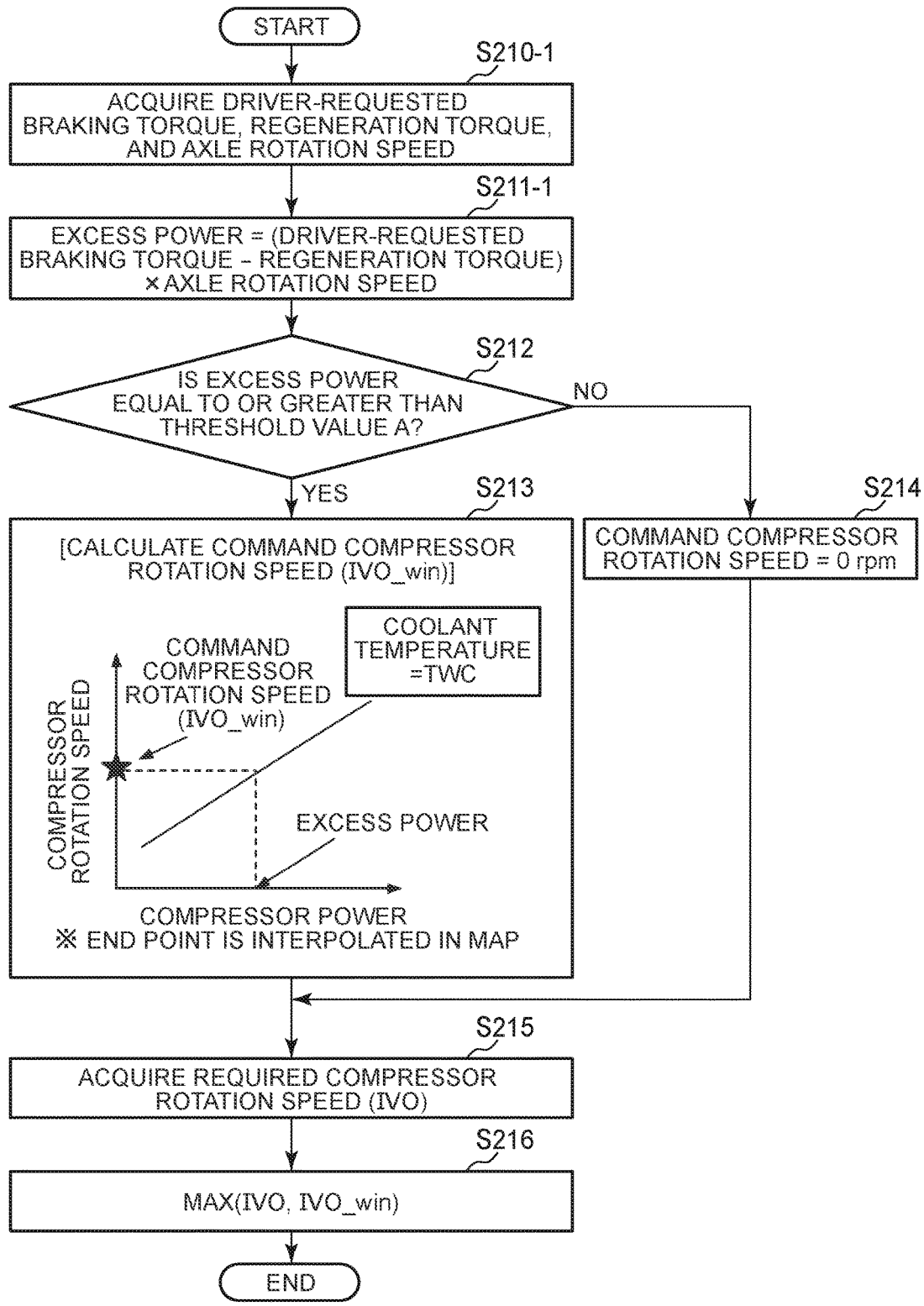
FIG. 19 is a flowchart illustrating an example of a process flow of air-conditioning control in consideration of a power able to be received Win according to a sixth embodiment.

FIG. 19 is a flowchart illustrating an example of a process flow of the air-conditioning control in consideration of the power able to be received Win according to a sixth embodiment. FIG. 19 illustrates a process flow of performing process details of Step S27 in FIG. 8.

In FIG. 19, the process details of Steps S210 and S211 in FIG. 9 are replaced with the process details of Steps S210-1 and S211-1. The others are the same as described above.

In Step S210-1, the HV ECU 70 acquires a driver-requested braking torque, a regeneration torque, and an axle rotation speed. The driver-requested braking torque denotes a value which is obtained by converting a required deceleration force of the vehicle calculated based on an amount of operation of a brake pedal (a depression amount) depressed by a driver into a torque on the drive shaft 14 using a predetermined relational expression or map. The regeneration torque denotes a value which is obtained by converting a regeneration torque of the MG1 or the MG2 into a torque on the drive shaft 14. The axle rotation speed denotes a rotation speed of the drive shaft 14. The HV ECU 70 calculates the driver-requested braking torque and acquires the regeneration torque and the axle rotation speed from the motor ECU 34.

In Step S211-1, the HV ECU 70 calculates excess power Ploss using the illustrated expression. Here, the product of the driver-requested braking torque and the axle rotation speed is the same as the required deceleration power Pr which needs to be generated in the drive shaft 14 in decelerating the vehicle. The product of the regeneration torque and the axle rotation speed is the same as electric power (regenerative power) which is regenerated by at least one of the MG1 and the MG2. Since the power able to be received Win is considered, the regenerative power of at least one of the MG1 and the MG2 is set to be smaller than the power able to be received Win (when the regeneration direction is defined by a positive sign). However, the product of the regeneration torque and the axle rotation speed is substantially equal to the power able to be received Win and is not non-substitutable. That is, the HV ECU 70 can approximately calculate the excess power Ploss based on the expression described in S211-1.

(Driver-requested braking torque–regeneration torque) is substantially equal to a hydraulic brake torque, and the excess power Ploss is substantially equal to a loss of a hydraulic brake. Accordingly, when a hydraulic pressure of the hydraulic brake is measured, the measured hydraulic pressure may be converted into a torque and the excess power Ploss may be calculated.

Seventh Embodiment

Figure 20:
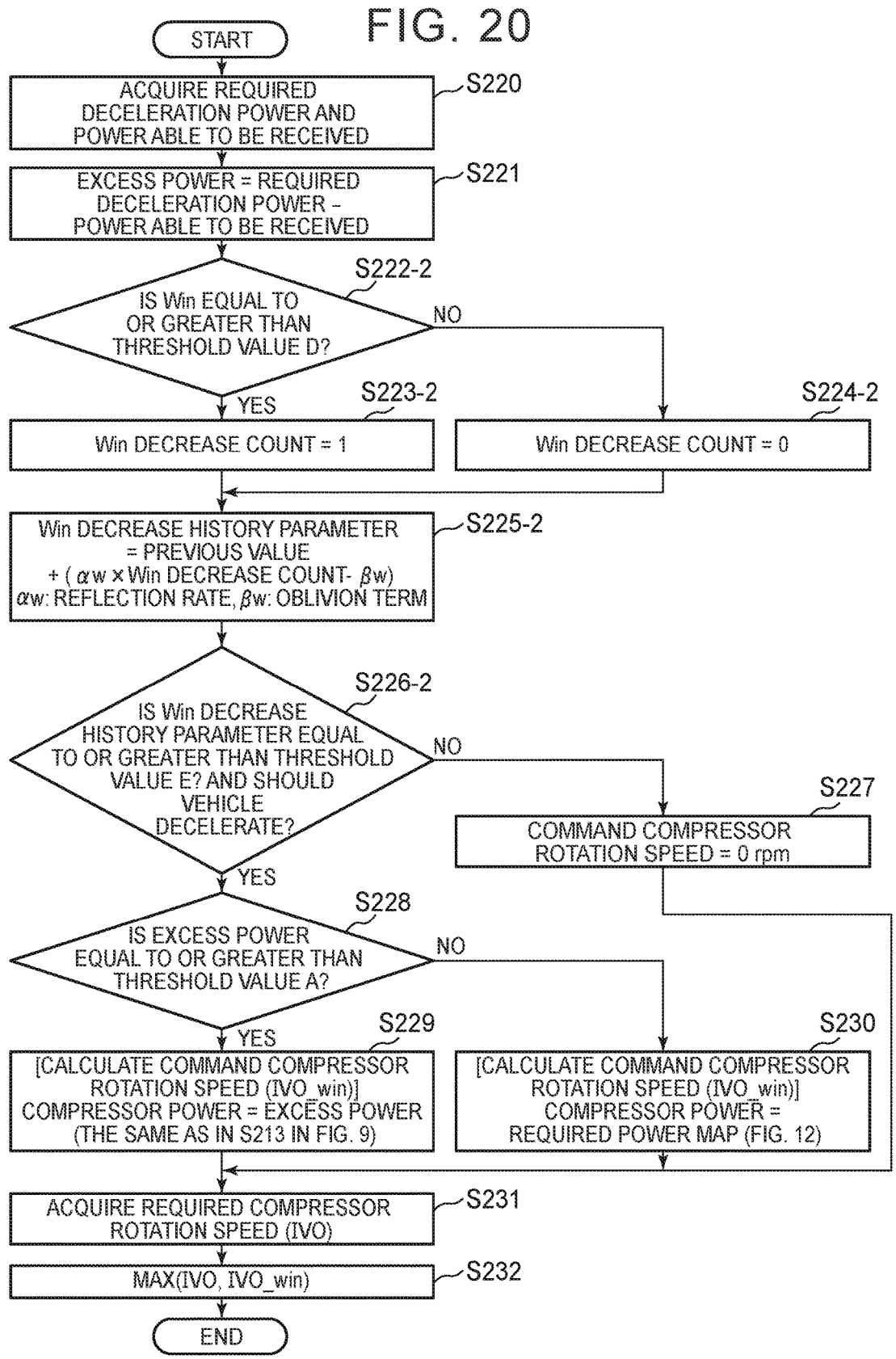
FIG. 20 is a flowchart illustrating an example of a process flow of air-conditioning control in consideration of a power able to be received Win according to the sixth embodiment.

FIG. 20 is a flowchart illustrating an example of a process flow of the air-conditioning control in consideration of the power able to be received Win according to a seventh embodiment. FIG. 20 illustrates a process flow of performing process details of Step S27 in FIG. 8.

In FIG. 20, the process details of Steps S222 to S226 in FIG. 11 are replaced with the process details of Steps S222-2 to S226-2. The others are the same as described above.

A decrease in the power able to be received Win is considered to be correlated with occurrence of the excess power Ploss. For example, in a high SOC state, the power able to be received Win decreases and the excess power Ploss is likely to occur. Therefore, in FIG. 20, the "occurrence of the excess power Ploss" in FIG. 11 is replaced with a "decrease in power able to be received Win."

In Step S222-2, the HV ECU 70 determines whether the power able to be received Win is equal to or greater than a predetermined threshold value D. The threshold value D is set to, for example, a value adapted in advance.

The HV ECU 70 performs the process of Step S223-2 when the power able to be received Win is equal to or greater than the threshold value D, and performs the process of Step S224-2 when the power able to be received Win is less than the threshold value D.

In Step S223-2, the HV ECU 70 sets a Win decrease count to a predetermined third count value (for example, 1). On the other hand, in Step S224-2, the HV ECU 70 sets the Win decrease count to a predetermined fourth count value (for example, 0). The fourth count value is smaller than the third count value. The Win decrease is an index indicating whether the excess power Ploss decreases.

In Step S225-2, the HV ECU 70 calculates a current Win decrease history parameter by adding ($\alpha w \times$Win decrease count$-\beta w$) to a previous Win decrease history parameter.

The Win decrease history parameter is an example of a numerical value into which an occurrence history of an event which is an occurrence of a power able to be received Win decrease is converted. The Win decrease history parameters $\alpha w$ and $\beta w$ have the same features as the excess power occurrence history parameters $\alpha m$ and $\alpha \beta m$ and detailed description thereof will not be repeated.

In Step S226-2, the HV ECU 70 determines whether the current Win decrease history parameter is equal to or greater than a predetermined threshold value E and the vehicle should stop. The threshold value E is a value adapted in advance. The HV ECU 70 performs the process of Step S228 when the current Win decrease history parameter is equal to or greater than the threshold value E and the vehicle should decelerate. On the other hand, the HV ECU 70 performs the process of Step S227 when the current Win decrease history parameter is less than the threshold value E and the vehicle should not decelerate.

Figure 21:
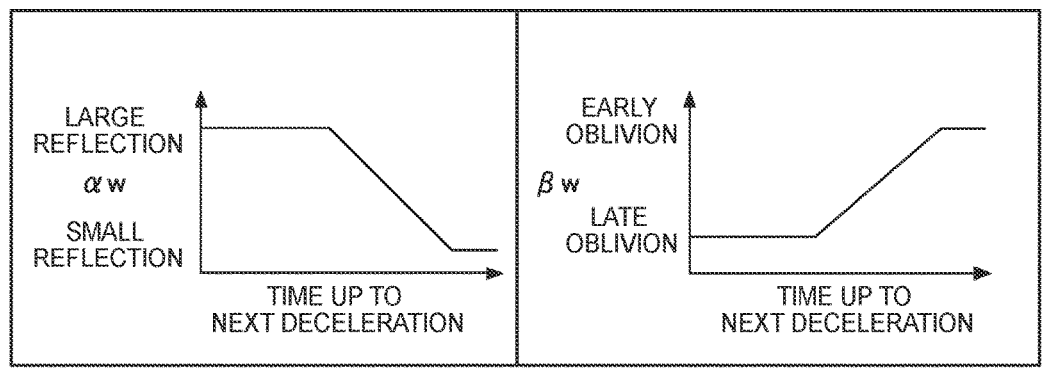
FIG. 21 is a diagram illustrating an example of relationships between a time until a predicted deceleration start time and αw and βw.

FIG. 21 is a diagram illustrating an example of a relationship between a time up to the predicted deceleration start time and $\alpha w$ and $\beta w$. The HV ECU 70 increases $\alpha w$ as the time from the current time to the predicted deceleration start time decreases and decreases $\beta w$ as the time from the current time to the predicted deceleration start time decreases, based on the relational rule illustrating the relationship.

In this way, the HV ECU 70 predicts the deceleration start time of the vehicle and can change the Win decrease history parameter to increase as the predicted deceleration start time approaches.

Figure 22:
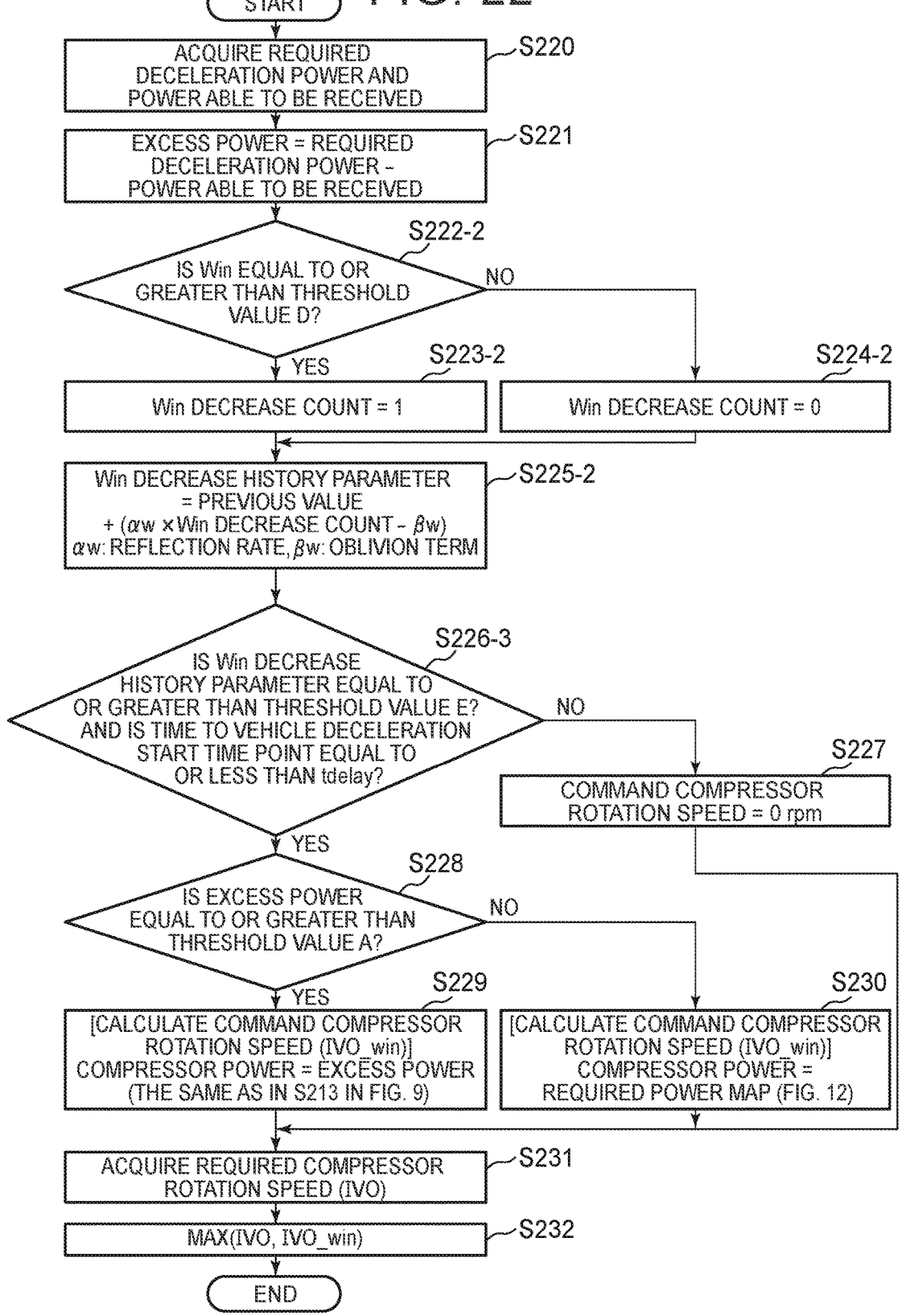
FIG. 22 is a flowchart illustrating an example of a process flow of air-conditioning control in consideration of a power able to be received Win according to a seventh embodiment.

FIG. 22 is a flowchart illustrating an example of a process flow of the air-conditioning control in consideration of the power able to be received Win according to a seventh embodiment. FIG. 22 illustrates a process flow of performing process details of Step S27 in FIG. 8.

In FIG. 22, the process details of Step S226-2 in FIG. 20 is replaced with the process details of Step S226-3. The others are the same as described above. The process details of Step S226-3 are the same as the process details of Step S226-2, and thus detailed description of Step S226-3 is the same as described above in Step S226-2, and will not be repeated.

Eighth Embodiment

Figure 23:
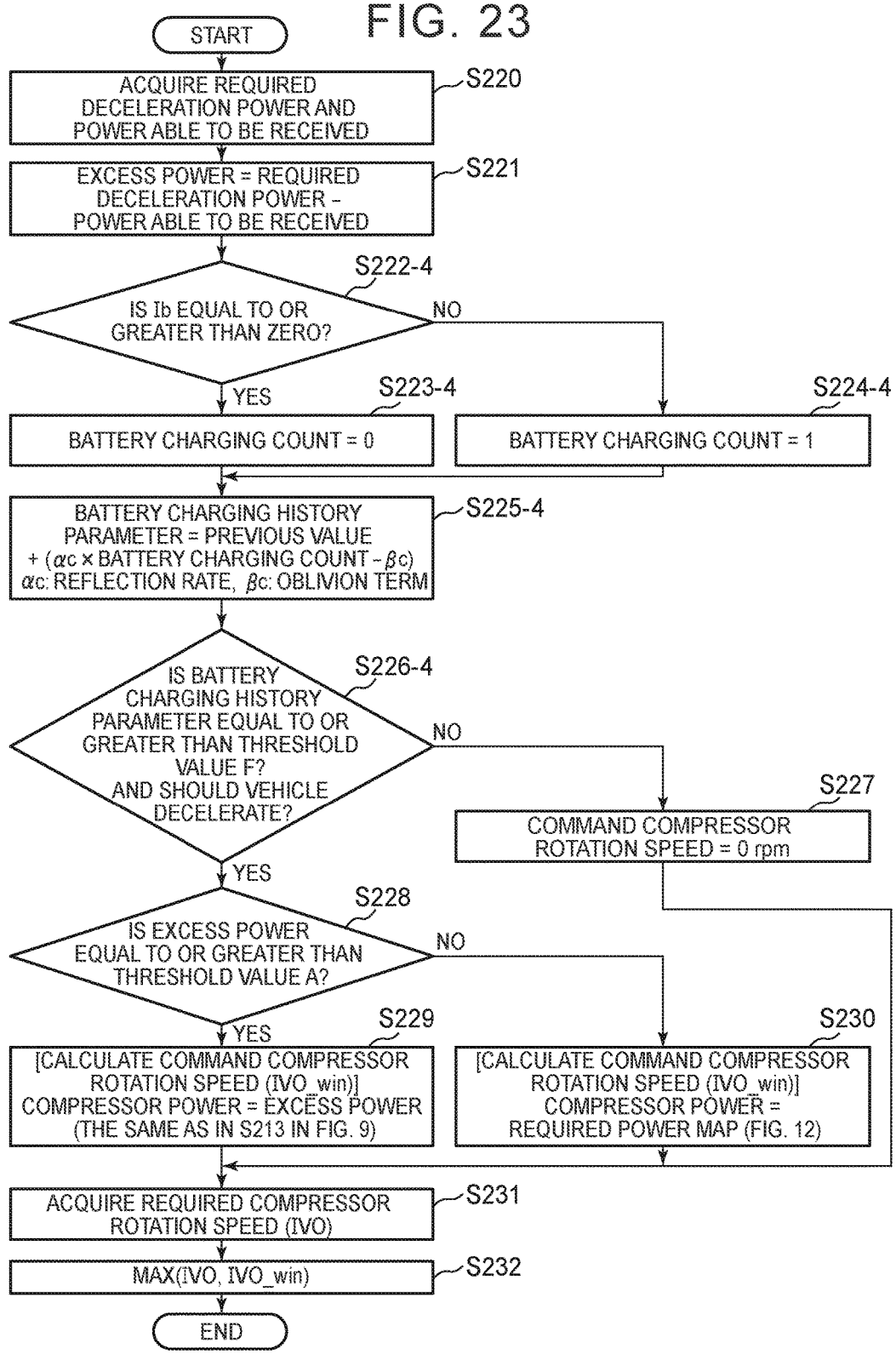
FIG. 23 is a flowchart illustrating an example of a process flow of air-conditioning control in consideration of a power able to be received Win according to an eighth embodiment.

FIG. 23 is a flowchart illustrating an example of a process flow of the air-conditioning control in consideration of the power able to be received Win according to an eighth embodiment. FIG. 23 illustrates a process flow of performing process details of Step S27 in FIG. 8.

In FIG. 23, the process details of Steps S222 to S226 in FIG. 11 are replaced with the process details of Steps S222-4 to S226-4. The others are the same as described above.

Charging of the secondary battery 40 when the excess power Ploss occurs is considered to be correlated with occurrence of the excess power Ploss. For example, in a high SOC state, when the secondary battery 40 is charged, the SOC increases and thus the excess power Ploss is likely to occur. Therefore, in FIG. 23, the "occurrence of the excess power Ploss" in FIG. 11 is replaced with "charging of the secondary battery 40 when the excess power Ploss occurs."

In Step S222-4, the HV ECU 70 determines whether a battery current Ib is equal to or greater than zero. The battery current Ib having a positive value denotes discharging of the secondary battery 40, and the battery current Ib having a negative value denotes charging of the secondary battery 40.

The HV ECU 70 performs the process of Step S223-4 when the battery current Ib is equal to or greater than zero, and performs the process of Step S224-4 when the battery current b is less than zero.

In Step S223-4, the HV ECU 70 sets a battery charging count to a predetermined fifth count value (for example, 0). On the other hand, in Step S224-4, the HV ECU 70 sets the battery charging count to a predetermined sixth count value (for example, 1). The fifth count value is smaller than the sixth count value. The battery charging count is an index indicating whether the secondary battery 40 is charged when the excess power Ploss occurs.

In Step S225-4, the HV ECU 70 calculates a current battery charging history parameter by adding ($\alpha c \times$battery charging count$-\beta c$) to a previous battery charging history parameter.

The battery charging history parameter is an example of a numerical value into which an occurrence history of an event which is charging of the secondary battery 40 when the excess power Ploss is converted. The battery charging history parameters $\alpha c$ and $\beta c$ have the same features as the excess power occurrence history parameters $\alpha m$ and $\alpha \beta m$ and detailed description thereof will not be repeated.

In Step S226-4, the HV ECU 70 determines whether the current battery charging history parameter is equal to or greater than a predetermined threshold value F and the vehicle should decelerate. The threshold value F is a value adapted in advance. The HV ECU 70 performs the process of Step S228 when the current battery charging history parameter is equal to or greater than the threshold value F and the vehicle should decelerate. On the other hand, the HV ECU 70 performs the process of Step S227 when the current battery charging history parameter is less than the threshold value F and the vehicle should not decelerate.

Figure 24:
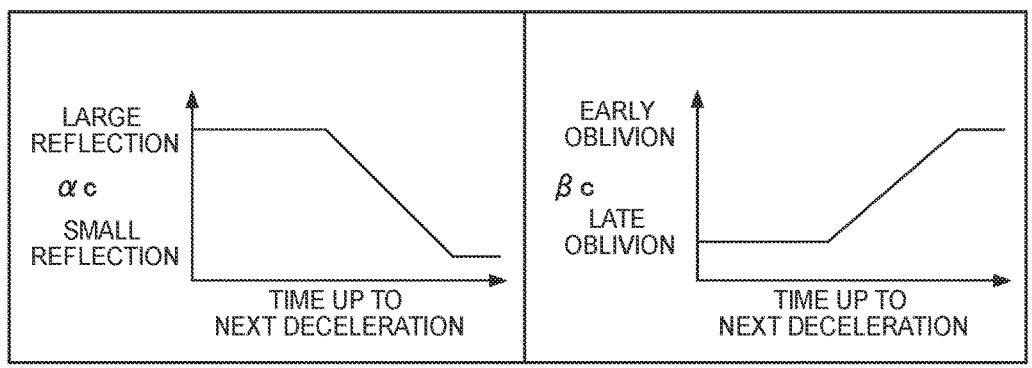
FIG. 24 is a diagram illustrating an example of relationships between a time until a predicted deceleration start time and αc and βc.

FIG. 24 is a diagram illustrating an example of a relationship between a time up to the predicted deceleration start time and αc and βc. The HV ECU 70 increases αc as the time from the current time to the predicted deceleration start time decreases and decreases βc as the time from the current time to the predicted deceleration start time decreases, based on the relational rule illustrating the relationship.

In this way, the HV ECU 70 predicts the deceleration start time of the vehicle and can change the battery charging history parameter to increase as the predicted deceleration start time approaches.

Figure 25:
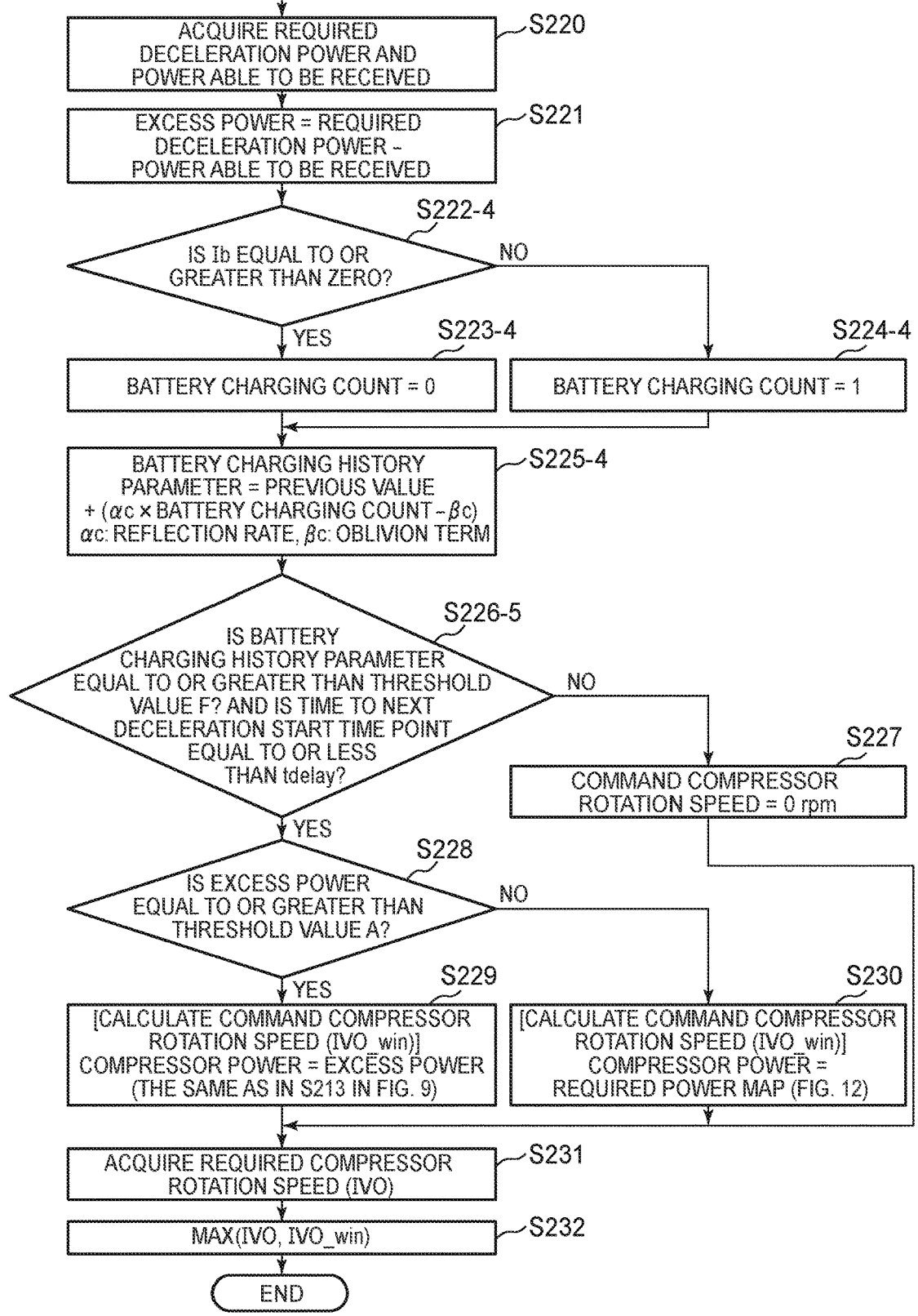
FIG. 25 is a flowchart illustrating an example of a process flow of air-conditioning control in consideration of a power able to be received Win according to the eighth embodiment.

FIG. 25 is a flowchart illustrating an example of a process flow of the air-conditioning control in consideration of the power able to be received Win according to a eighth embodiment. FIG. 25 illustrates a process flow of performing process details of Step S27 in FIG. 8.

In FIG. 25, the process details of Step S226-4 in FIG. 23 is replaced with the process details of Step S226-5. The others are the same as described above. The process details of Step S226-5 are the same as the process details of Step S226-2, and thus detailed description of Step S226-5 is the same as described above in Step S226-2, and will not be repeated.

While a control system for a vehicle has been described above with reference to embodiments, the disclosure is not limited to the embodiments. Various modifications and improvements such as combinations or substitution with a part or all of the other embodiments can be made within the scope of the disclosure.

The embodiments may be defined as follows. A control system for a vehicle, the control system including: a motor-generator configured to regenerate electric power when the vehicle decelerates; a secondary battery configured to be charged with the electric power regenerated by the motor-generator; an electrical load configured to be activated with electric power from at least one of the motor-generator and the secondary battery; a power supply device configured to supply the electrical load with the electric power generated by the motor-generator based on deceleration power which is generated by a braking operation of the vehicle; and an electronic control unit configured to calculate excess power which is electric power exceeding chargeable power with which the secondary battery is chargeable of a required deceleration power required by the braking operation, and to control the power supply device in accordance with a command value for causing the electric power supplied from the power supply device to the electrical load to be less than the excess power. The electronic control unit may be configured to: calculate a required value for causing the power supply device to supply electric power required for operation of the electrical load in response to a request from a user; and control the power supply device based on one of the command value and the required value, electric power supplied to the electrical load based on the one of the command value and the required value is greater than electric power supplied to the electrical load based on the other one of the command value and the required value. The electronic control unit may be configured to: convert an occurrence history of one event of an occurrence of the excess power, a decrease in the chargeable power, and a charging of the secondary battery when the excess power occurs into a numerical value such that the numerical value increases as an occurrence frequency of the event increases and the numerical value decreases as time elapses; and the power supply device may be configured to supply electric power generated from the motor-generator based on the deceleration power to the electrical load even when the numerical value of the occurrence history is equal to or greater than a threshold value, the vehicle decelerates, and the excess power is less than electric power required for operation of the electrical load. The electronic control unit may be configured to: predict a deceleration start time of the vehicle; and convert the occurrence history into a numerical value such that the numerical value increases as the deceleration start time approaches. The control system for a vehicle may further include a server disposed at a position separated from a plurality of vehicles, wherein the server is configured to accumulate deceleration position information indicating positions at which the plurality of vehicles have decelerated, and the electronic control unit is configured to predict the deceleration start time of a host vehicle based on the deceleration position information and current position information of the host vehicle. The electrical load may be an electrical load of an air-conditioning device, and the air-conditioning device may be configured to store heat generated by operation of the electrical load. The electronic control unit may be configured not to allow the power supply device to operate in response to the command value when the electrical load performs a transition operation before a current temperature converges on a target temperature, and to allow the power supply device to operate in response to the command value when the electrical load performs a regular operation after the current temperature converges on the target temperature.

What is claimed is:

1. A control system for a vehicle, the control system comprising:
    a motor-generator configured to regenerate an electric power when the vehicle decelerates;
    a secondary battery configured to be charged with the electric power regenerated by the motor-generator;
    an electrical load configured to be activated with an electric power supplied from at least one of the motor-generator and the secondary battery;
    a power supply device configured to supply the electrical load with the electric power generated by the motor-generator based on a deceleration power which is generated by a braking operation of the vehicle; and
    an electronic control unit configured to
        calculate an excess power which is an electric power exceeding chargeable power with which the secondary battery is chargeable of a required deceleration power required by the braking operation, and
        control the power supply device in accordance with a command value for causing the electric power supplied from the power supply device to the electrical load to be less than the excess power.

2. The control system according to claim 1, wherein the electronic control unit is configured to:
    calculate a required value for causing the power supply device to supply electric power required for operation of the electrical load in response to a request from a user; and
    control the power supply device based on one of the command value and the required value, electric power supplied to the electrical load based on the one of the command value and the required value is greater than electric power supplied to the electrical load based on the other one of the command value and the required value.

3. The control system according to claim 2, wherein the electronic control unit is configured to convert an occurrence history of one event of an occurrence of the excess power, a decrease in the chargeable power, and a charging of the secondary battery when the excess power occurs into a numerical value such that the numerical value increases as an occurrence frequency of the event increases and the numerical value decreases as time elapses, and the power supply device is configured to supply electric power generated from the motor-generator based on the deceleration power to the electrical load even when the numerical value of the occurrence history is equal to or greater than a threshold value, the vehicle decelerates, and the excess power is less than electric power required for operation of the electrical load.

4. The control system according to claim 3, wherein the electronic control unit is configured to:

predict a deceleration start time of the vehicle; and convert the occurrence history into a numerical value such that the numerical value increases as the deceleration start time approaches.

5. The control system according to claim 4, further comprising a server disposed at a position separated from a plurality of vehicles, wherein the server is configured to accumulate deceleration position information indicating positions at which the plurality of vehicles have decelerated, and the electronic control unit is configured to predict the deceleration start time of a host vehicle based on the deceleration position information and current position information of the host vehicle.

6. The control system according to claim 2, wherein the electrical load is an electrical load of an air-conditioning device, and the air-conditioning device is configured to store heat generated by operation of the electrical load.

7. The control system according to claim 6, wherein the electronic control unit is configured:

not to allow the power supply device to operate in response to the command value when the electrical load performs a transition operation before a current temperature converges on a target temperature; and to allow the power supply device to operate in response to the command value when the electrical load performs a regular operation after the current temperature converges on the target temperature.

8. The control system according to claim 1, wherein the electrical load is an electrical load of an air-conditioning device, and the electronic control unit is configured:

not to allow the power supply device to operate in response to the command value when the electrical load performs a transition operation before a current temperature converges on a target temperature; and to allow the power supply device to operate in response to the command value when the electrical load performs a regular operation after the current temperature converges on the target temperature.

* * * * *

UNITED STATES PATENT AND TRADEMARK OFFICE
CERTIFICATE OF CORRECTION

PATENT NO. : 10,160,443 B2
APPLICATION NO. : 15/661326
DATED : December 25, 2018
INVENTOR(S) : Tetsuya Sugimoto It is certified that error appears in the above-identified patent and that said Letters Patent is hereby corrected as shown below:

In the Specification

In Column 20, Line 43, delete "," after "product".

Signed and Sealed this
Fifth Day of March, 2019

Andrei Iancu
*Director of the United States Patent and Trademark Office*